(12) United States Patent
Ku et al.

(10) Patent No.: US 9,839,102 B2
(45) Date of Patent: Dec. 5, 2017

(54) LIGHTING CONTROL METHOD AND LIGHTING CONTROL SYSTEM

(71) Applicant: LG INNOTEK CO., LTD., Seoul (KR)

(72) Inventors: Ja Hong Ku, Seoul (KR); Won Taek Lim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/207,124

(22) Filed: Jul. 11, 2016

(65) Prior Publication Data

US 2016/0323982 A1 Nov. 3, 2016

Related U.S. Application Data

(63) Continuation of application No. 14/413,908, filed as application No. PCT/KR2013/006210 on Jul. 11, 2013, now Pat. No. 9,439,271.

(30) Foreign Application Priority Data

Jul. 12, 2012 (KR) .......... 10-2012-0076312
Aug. 16, 2012 (KR) .......... 10-2012-0089328
Sep. 25, 2012 (KR) .......... 10-2012-0106766

(51) Int. Cl.
  *H05B 37/02* (2006.01)
  *H04W 4/00* (2009.01)
  *G05B 15/02* (2006.01)

(52) U.S. Cl.
  CPC ......... *H05B 37/0272* (2013.01); *G05B 15/02* (2013.01); *H04W 4/008* (2013.01)

(58) Field of Classification Search
  CPC ............ H05B 37/02; H05B 37/0245; H05B 37/0272; H05B 33/0842; H05B 33/0815; Y02B 20/346; Y02B 20/48; F21Y 2115/10
  USPC ............ 315/131, 153, 292, 294, 312, 307; 455/3.03, 41.2, 522
  See application file for complete search history.

(56) References Cited

U.S. PATENT DOCUMENTS 6,803,728 B2   10/2004   Balasubramaniam et al.
7,550,931 B2   6/2009    Lys et al.
8,190,096 B2   5/2012    Rutjes et al.
(Continued)

FOREIGN PATENT DOCUMENTS

CN   201504341 U   6/2010
CN   101990334 A   3/2011
(Continued)

OTHER PUBLICATIONS

Office Action dated Feb. 14, 2016 in Chinese Application No. 201380037178.7.
(Continued)

*Primary Examiner* — Haissa Philogene
(74) *Attorney, Agent, or Firm* — Saliwanchik, Lloyd & Eisenschenk

(57) ABSTRACT

Disclosed are a lighting control method and a lighting control system. The lighting control apparatus makes communication with lighting devices, registers at least one of the lighting devices according to received signal strengths of the lighting devices, and controls the registered lighting device. The lighting control apparatus easily registers and controls the lighting devices.

15 Claims, 19 Drawing Sheets

(56) References Cited

U.S. PATENT DOCUMENTS

| | | |
|---|---|---|
| 8,928,232 B2 | 1/2015 | Aggarwal et al. |
| 9,078,313 B2 | 7/2015 | Recker et al. |
| 9,392,657 B2 * | 7/2016 | Lee .................. H05B 33/0842 |
| 9,439,271 B2 * | 9/2016 | Ku .......................... H05B 37/02 |
| 2006/0116147 A1 | 6/2006 | Hashizume |
| 2006/0125426 A1 | 6/2006 | Veskovic et al. |
| 2008/0218334 A1 | 9/2008 | Pitchers et al. |
| 2009/0045971 A1 | 2/2009 | Simons et al. |
| 2009/0218951 A1 | 9/2009 | Weaver |
| 2010/0036512 A1 | 2/2010 | Rutjes et al. |
| 2011/0122796 A1 | 5/2011 | Simons et al. |
| 2011/0140864 A1 | 6/2011 | Bucci |
| 2011/0234366 A1 | 9/2011 | Feng et al. |
| 2011/0310621 A1 | 12/2011 | Van Der Stok et al. |
| 2012/0013508 A1 | 1/2012 | Bao et al. |
| 2013/0063042 A1 | 3/2013 | Bora et al. |
| 2014/0015415 A1 | 1/2014 | Lim et al. |
| 2015/0282283 A1 | 10/2015 | Kim et al. |

FOREIGN PATENT DOCUMENTS

| | | |
|---|---|---|
| CN | 102157054 A | 8/2011 |
| JP | H06310284 A | 11/1994 |
| JP | H07122368 A | 5/1995 |
| JP | 2001189196 A | 7/2001 |
| JP | 2001-244084 A | 9/2001 |
| JP | 2001244084 A | 9/2001 |
| JP | 2002289369 A | 10/2002 |
| JP | 2006093098 | 4/2006 |
| JP | 2006101293 A | 4/2006 |
| JP | 2007122993 A | 5/2007 |
| JP | 2008289369 A | 12/2008 |
| JP | 2009017267 A | 1/2009 |
| JP | 2009-043458 A | 2/2009 |
| JP | 2009043458 A | 2/2009 |
| JP | 2011175757 A | 9/2011 |
| JP | 2011-234204 A | 11/2011 |
| JP | 2011234204 A | 11/2011 |
| JP | 2012048909 | 3/2012 |
| JP | 2014022371 A | 2/2014 |
| JP | 5678136 B2 | 2/2015 |
| KR | 101111731 B1 | 3/2012 |
| WO | WO-2007-102112 A1 | 9/2007 |
| WO | WO-2008129488 A3 | 12/2008 |
| WO | WO-2010-064159 A1 | 6/2010 |
| WO | WO-2010-097737 A1 | 9/2010 |

OTHER PUBLICATIONS

Office Action dated Jan. 12, 2016 in Japanese Application No. 2014265872.
Office Action dated Oct. 15, 2015 in U.S. Appl. No. 14/413,908.
International Search Report dated Oct. 30, 2013 in International Application No. PCT/KR2013/006210, filed Jul. 11, 2013.
Office Action dated May 27, 2014 in Japanese Application No. 2013-146938.
Office Action dated Oct. 28, 2013 in Korean Application No. 10-2012-0106766, filed Sep. 25, 2012.
European Search Report dated Nov. 18, 2013 in European Application No. 13175755.
European Search Report in European Application No. EP13817102.
Office Action dated Jul. 1, 2016 in U.S. Appl. No. 15/085,280.
Office Action dated Jan. 13, 2017 in U.S. Appl. No. 15/085,280.

* cited by examiner

FIGURE 19

| Len (1Byte) | Dest.D A (8Bytes) | Src.D A (8Bytes) | Command (1Byte) | Payload (Var.) |
|---|---|---|---|---|
| 0x13 | 0xffffffffffffffff | address of reference lighting device | 0x02 (scan) | NULL |

FIGURE 20

| Len (1Byte) | Dest.D A (8Bytes) | Src.D A (8Bytes) | Command (1Byte) | Payload (1Byte) |
|---|---|---|---|---|
| 0x13 | address of reference lighting device | address of responding lighting device | 0x02 (scan) | RSSI value |

LIGHTING CONTROL METHOD AND LIGHTING CONTROL SYSTEM

CROSS-REFERENCE TO RELATED APPLICATIONS

This application is a continuation application of Ser. No. 14/413,908, filed Jan. 9, 2015, which is the U.S. national stage application of International Patent Application No. PCT/KR2013/006210, filed Jul. 11, 2013, which claims priority to Korean Application Nos. 10-2012-0076312, filed Jul. 12, 2012; 10-2012-0089328, filed Aug. 16, 2012; and 10-2012-0106766, filed Sep. 25, 2012, the disclosures of each of which are incorporated herein by reference in their entirety.

TECHNICAL FIELD

The embodiment relates to a lighting control method and a lighting control system.

BACKGROUND ART

According to a general lighting control scheme, since a power switch is linked with a lighting device through a cable one to one, when recognizing the switch of a desired lighting device, the lighting device can be controlled.

Meanwhile, as published in Korean Unexamined Patent Publication No. 10-2008-0067556, recently, the lighting device is controlled through a wireless scheme.

In general, a system to wirelessly control power of lighting devices transmits control signals to the lighting devices by inserting intrinsic identifiers of the lighting devices, which are used to distinguish the lighting devices from each other, into the control signal, so that the lighting devices can be individually controlled.

Meanwhile, a wireless transmitter, which serves as a wireless lighting control apparatus, is allocated with an intrinsic identifier at a time point where the wireless transmitter is released from the factory thereof, and the identifier of the wireless transmitter is registered in a lighting device installed at a home, so that the wireless transmitter can control at least one lighting device.

DISCLOSURE

Technical Problem

However, according to the related art, when a user or an operator (collectively, referred to as "user") of the wireless lighting control apparatus sets the identifier by using a wireless signal at a remote place, a target lighting device and other lighting devices located around the target lighting device simultaneously receive the wireless signal remotely transmitted, so that a plurality of lighting devices may be set with the same identifier.

In particular, in the situation that several homes are adjacent to each other like apartments, the distance from a home desiring the setting of a lighting device to surrounding homes located at the top, down, left, and right of the home desiring the setting of the lighting device is very short. Accordingly, when the identifier is set in the target lighting device through the wireless transmitter at a predetermined home, other lighting devices existing within the transmission range of the wireless transmitter are changed into a registration setting mode together with the target lighting device. Accordingly, lighting devices installed at adjacent homes may be controlled together in addition to the target lighting device.

Technical Solution

The embodiment provides a lighting control apparatus capable of easily registering and controlling lighting devices.

According to the embodiment, there is provided a lighting control system. The lighting control system includes lighting devices, and a lighting control apparatus for registering at least one of the lighting devices and for controlling the registered lighting device. The lighting control apparatus registers at least one of the lighting devices as a reference lighting device and registers at least one of other lighting devices according to received signal strengths between the reference lighting device and the other lighting devices.

According to the embodiment, there is provided a lighting control method. The lighting control method includes registering at least one of lighting devices by a lighting control apparatus, and controlling the registered lighting device by the lighting control apparatus. The registering at least one of the lighting devices includes registering one of the lighting devices as a reference lighting device by the lighting control apparatus, and registering at least one of other lighting device according to received signal strengths between the reference lighting device and the other lighting devices, by the lighting control apparatus.

Advantageous Effects

As described above, according to the lighting control method and lighting control system of the embodiment, the lighting control apparatus can easily register and control lighting devices.

DESCRIPTION OF DRAWINGS

FIG. 19 is a view to explain a data format of a peripheral search signal of a first reference lighting device of FIG. 18.

FIG. 20 is a view to explain a data format of a response message of the peripheral lighting device of FIG. 18.

MODE FOR INVENTION

Figure 1:
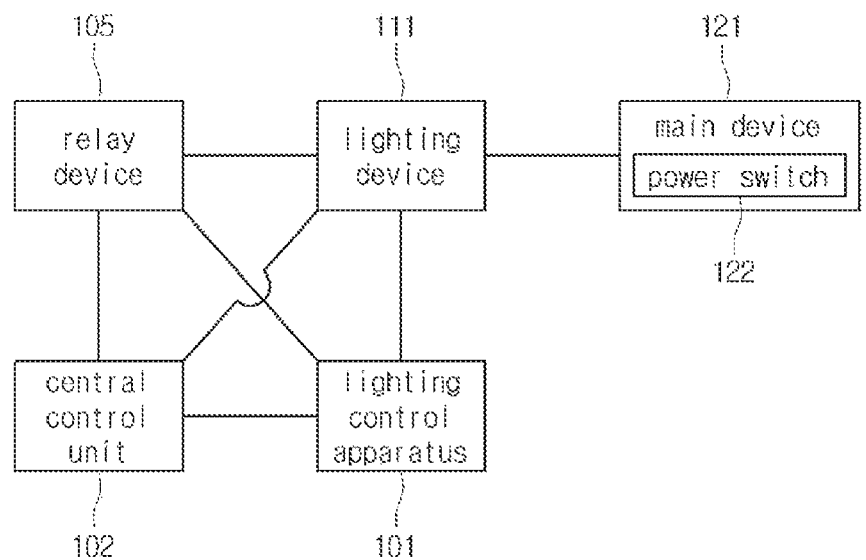
FIG. 1 is a block diagram showing a lighting control system according to embodiments.

Hereinafter, embodiments will be described with reference to accompanying drawings. In this case, the same elements will be assigned with the same reference numerals. In addition, the details of the generally known function and structure, which make the subject matter of the embodiment unclear, will be omitted.

FIG. 1 is a block diagram showing a lighting control system according to embodiments.

Referring to FIG. 1, the lighting control system according to the present embodiments includes a lighting control apparatus 101 and a plurality of lighting devices 111. In this case, the lighting control apparatus 101 makes communication with the lighting devices 111 through a wired scheme or a wireless scheme. In this case, the lighting control apparatus 101 may directly make communication with the lighting devices 111. Each lighting device 111 has intrinsic identification data, and the lighting control apparatus 101 may identify the lighting devices 111 according to the identification data thereof. Accordingly, the lighting control apparatus 101 may control at least one of the lighting devices 111 according to a user command. For example, the lighting control apparatus 101 may include a wireless switch, a remote control, and a cellular phone. In addition, the lighting devices 111 may include light emitting diodes (LEDs), a fluorescent lamp, an incandescent lamp, and a halogen lamp.

In addition, the lighting control system according to the embodiments may further include at least one of a central control device 102, a relay device 105, and a main device 121. The central control device 102 may control the lighting control system as a whole. The relay device 105 relays the communication between the lighting control apparatus 101 and the lighting devices 111. In other words, the lighting control apparatus 101 and the lighting devices 111 may make communicate with each other through the relay device 105. In this case, the relay device 105 may make wired or wireless communication with the lighting control apparatus 101 and the lighting devices 111. The main device 121 may control the lighting devices 111 separately from the lighting control apparatus 101. The main device 121 may be connected to the lighting devices 111 through a cable, and the lighting devices 111 may include a power switch 122 to turn on or turn off the lighting devices 111.

In this case, the lighting control system according to the embodiments is operable according to various radio frequency (RF) communication schemes. For example, the wireless communication scheme may include Zigbee, WiFi, and Bluetooth.

Figure 2:
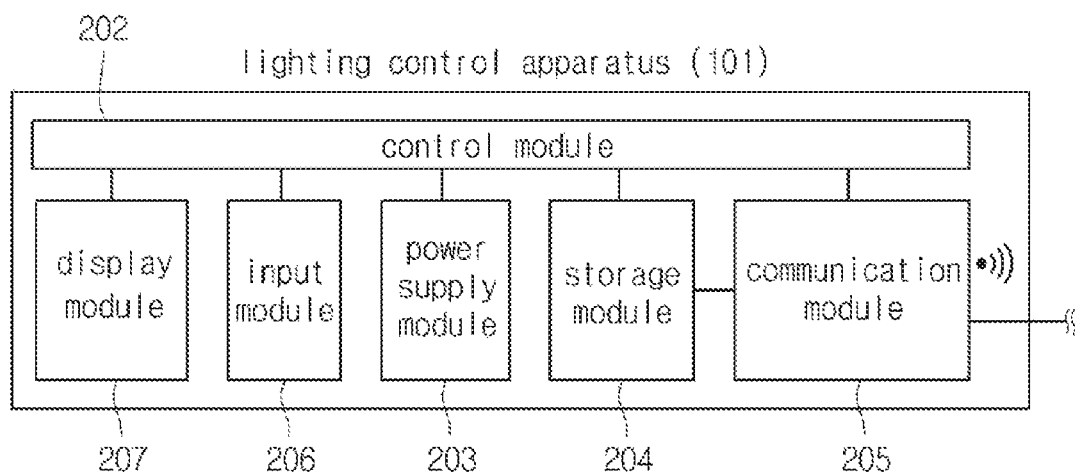
FIG. 2 is a block diagram showing a lighting control apparatus shown in FIG. 1.

FIG. 2 is a block diagram showing the lighting control apparatus in the lighting control system according to the embodiments.

Referring to FIG. 2, the lighting control apparatus 101 according to the present embodiments includes a control module 202, a power supply module 203, a storage module 204, a communication module 205, an input module 206, and a display module 207. The control module 202 controls the overall operation of the lighting control apparatus 101. The control module 202 registers and controls at least one of the lighting devices 111 according to received signal strengths of the lighting devices 111. In this case, the control module 202 may register at least one of the lighting devices 111 at a registration mode, and may control the registered lighting device 111 at a control mode. The power supply module 203 supplies operating power of the lighting control apparatus 101. The storage module 204 stores programs to register and control at least one of the lighting devices 111 in the lighting control apparatus 101. In addition, the storage module 204 may store at least one identification data of the lighting devices 111. The communication module 205 performs the communication function of the lighting control apparatus 101 under the control of the control module 202. In this case, the communication module 205 may make communication with the lighting devices 111. The input module 206 is provided to input a user command. The display module 207 displays various screen images under the control of the control module 202.

Figure 3:
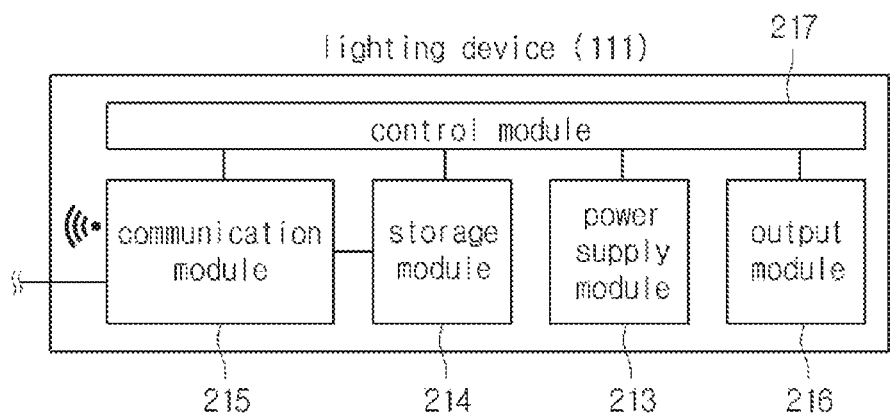
FIG. 3 is a block diagram showing a lighting device shown in FIG. 1.

FIG. 3 is a block diagram showing the lighting device in the lighting control system according to the embodiments.

Referring to FIG. 3, the lighting device 111 according to the present embodiment includes a power supply module 213, a storage module 214, a communication module 215, an output module 216, and a control module 217. The power supply module 213 supplies driving power of the lighting device 111. The storage module 214 stores the intrinsic identification data of the lighting device 111. The communication module 215 performs the communication function of the lighting device 111 under the control of the control module 217. In this case, the communication module 215 may make communication with the lighting control apparatus 101. The output module 216 outputs light under the control of the control module 217. In this case, the output module 216 may output preset color light. The control module 217 controls the overall operation of the lighting device 111. Meanwhile, although not shown, the lighting device 111 according to the present embodiment may further include an audio processing module to output an audio signal under the control of the control module 217.

Figure 4:
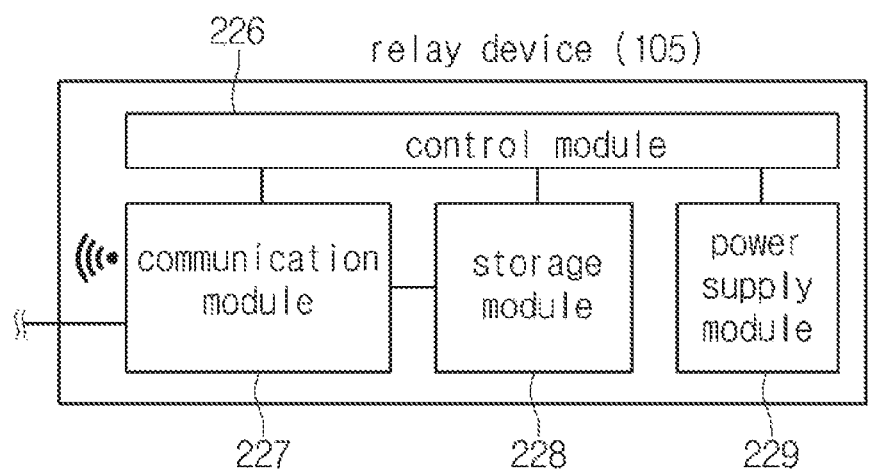
FIG. 4 is a block diagram showing a relay device shown in FIG. 1.

FIG. 4 is a block diagram showing the relay device in the lighting control system according to the embodiments.

Referring to FIG. 4, the relay device 105 according to the present embodiment includes a control module 226, a communication module 227, a storage module 228, and a power supply module 229. The control module 226 controls the overall operation of the relay device 105. The control module 226 relays the communication between the lighting control apparatus 101 and the lighting devices 111. The communication module 227 performs a communication function of the relay device 105 under the control of the control module 226. In this case, the communication module 227 may make communication with the lighting control apparatus 101 and the lighting devices 111. The storage module 228 stores programs to relay the communication between the lighting control apparatus 101 and the relay device 105. The power supply module 229 supplies the driving power of the relay device 105.

According to the first embodiment, the lighting control apparatus 101 performs a registration mode to register the lighting device 111. The lighting control apparatus 101 may request the registration of the lighting control apparatus 101 to the lighting device 111. If the lighting control apparatus 101 requests the registration, the lighting device 111 may register the lighting control apparatus 101. In addition, the lighting control apparatus 101 may register the lighting device 111. Thereafter, the lighting control apparatus 101 performs a control mode to control the registered lighting device 111. In this case, the lighting control apparatus 101 may turn on or turn off the registered lighting device 111 or may control the dimming of the registered lighting device 111.

Figure 5:
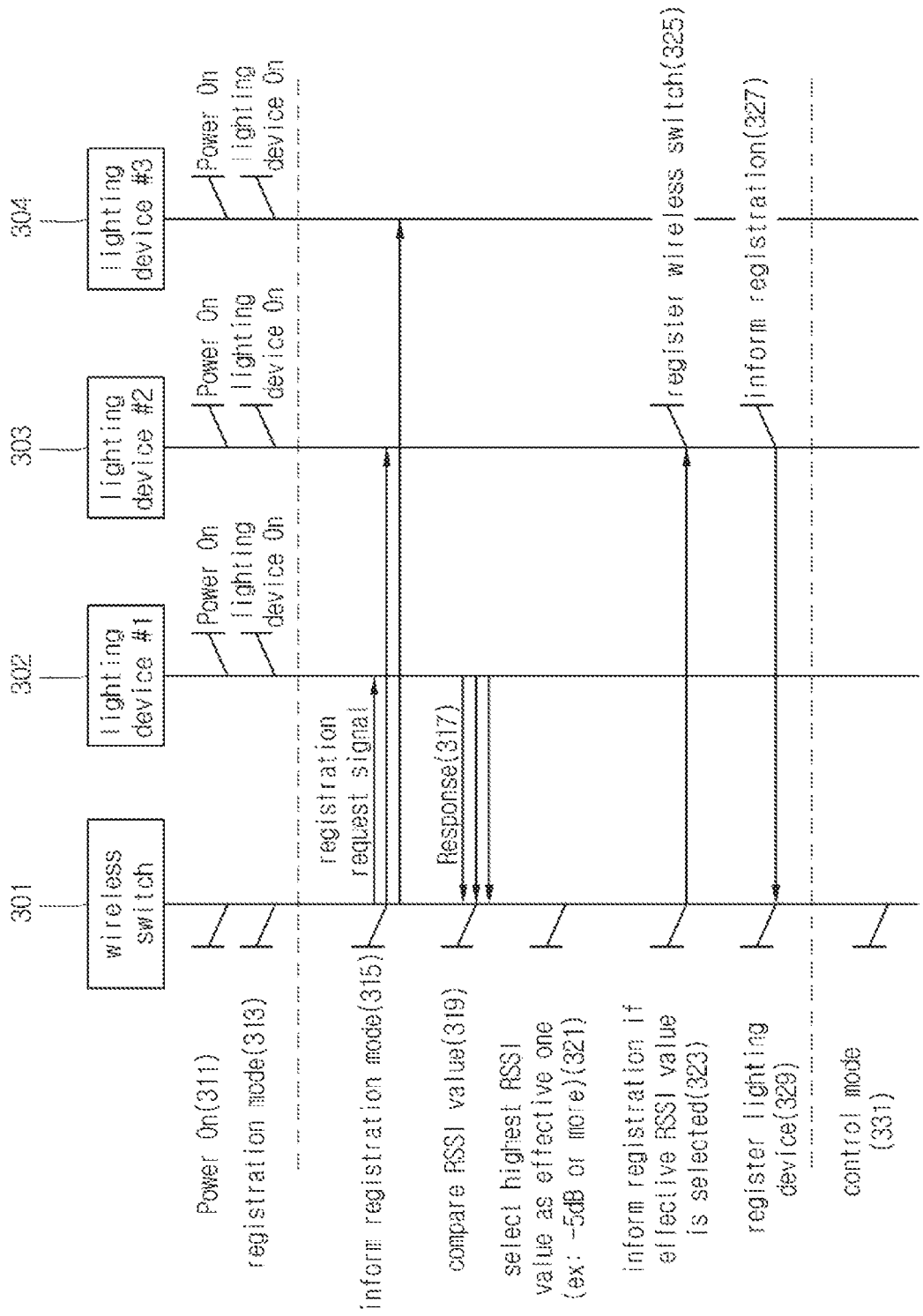
FIG. 5 is a flowchart showing the first example of a lighting control procedure according to the first embodiment.

FIG. 5 is a flowchart showing the first example of the lighting control procedure according to the first embodiment. According to the present embodiment, one lighting control apparatus 101 registers and controls one lighting device 111. In this case, according to the present embodiment, the lighting control apparatus 101 is assumed as a wireless switch 301 for explanation.

Referring to FIG. 5, according to the light control procedure of the present embodiment, in the state that the wireless switch 301 and the lighting devices 302, 303, and 304 are powered on (step 311), the wireless switch 301 performs a registration mode (step 313). In this case, if one of the lighting devices 302, 303, and 304 is registered in the wireless switch 301, the wireless switch 301 does not perform the registration mode. For example, the wireless switch 301 may include a registration execution key, and may enter the registration mode corresponding to the selection of the registration execution key. In addition, the wireless switch 301 detects the power-on state to enter the registration mode. In this case, the wireless switch 301 may enter the registration mode and may perform a registration mode for a preset time (e.g., 1 second).

In detail, at the registration mode, the wireless switch 301 transmits a registration request signal to each of the lighting devices 302, 303, and 304 to inform each of the lighting devices 302, 303, and 304 that the wireless switch 301 is in the middle of performing the registration mode (step 315). If the registration request signal is received from the wireless switch 301, each of the lighting devices 302, 303, and 304 transmits a response message corresponding to the registration request signal to the wireless switch 301 (step 317). In this case, the response message includes identification data of each of the lighting devices 302, 303, and 304.

Next, if response messages are received from the lighting devices 302, 303, and 304, the wireless switch 301 compares received signal strengths of the response messages with each other (step 319). Next, the wireless switch 301 selects an effective received signal strength among the received signal strengths of the response messages (step 321). In this case, the wireless switch 301 may select the highest received signal strength. Then, the wireless switch 301 may compare the selected received signal strength with the stored received signal strength. For example, if the previously-stored received signal strength is −5 dB, the wireless switch 301 may determine if the selected received signal strength is −5 dB or more. If the selected received signal strength is equal to or more than the previously-stored received signal strength, the wireless switch 301 may determine the selected received signal strength as effective one.

Next, the wireless switch 301 requests the registration of the wireless switch 301 at the lighting device 303 corresponding to the effective received signal strength (step 323). The lighting device 303 registers the wireless switch 301 if the registration of the wireless switch 301 is requested (step 325). In addition, if the lighting device 303 informs the wireless switch 301 about the registration of the wireless switch 301. In addition, if the registration of the wireless switch 301 is confirmed from the lighting device 303, the wireless switch 301 registers the lighting device 303 therein and terminates the registration mode (step 329).

Next, the wireless switch 301 performs a control mode (step 331). In this case, the wireless switch 301 may control the registered lighting device 303 according to the user command.

Figure 6:
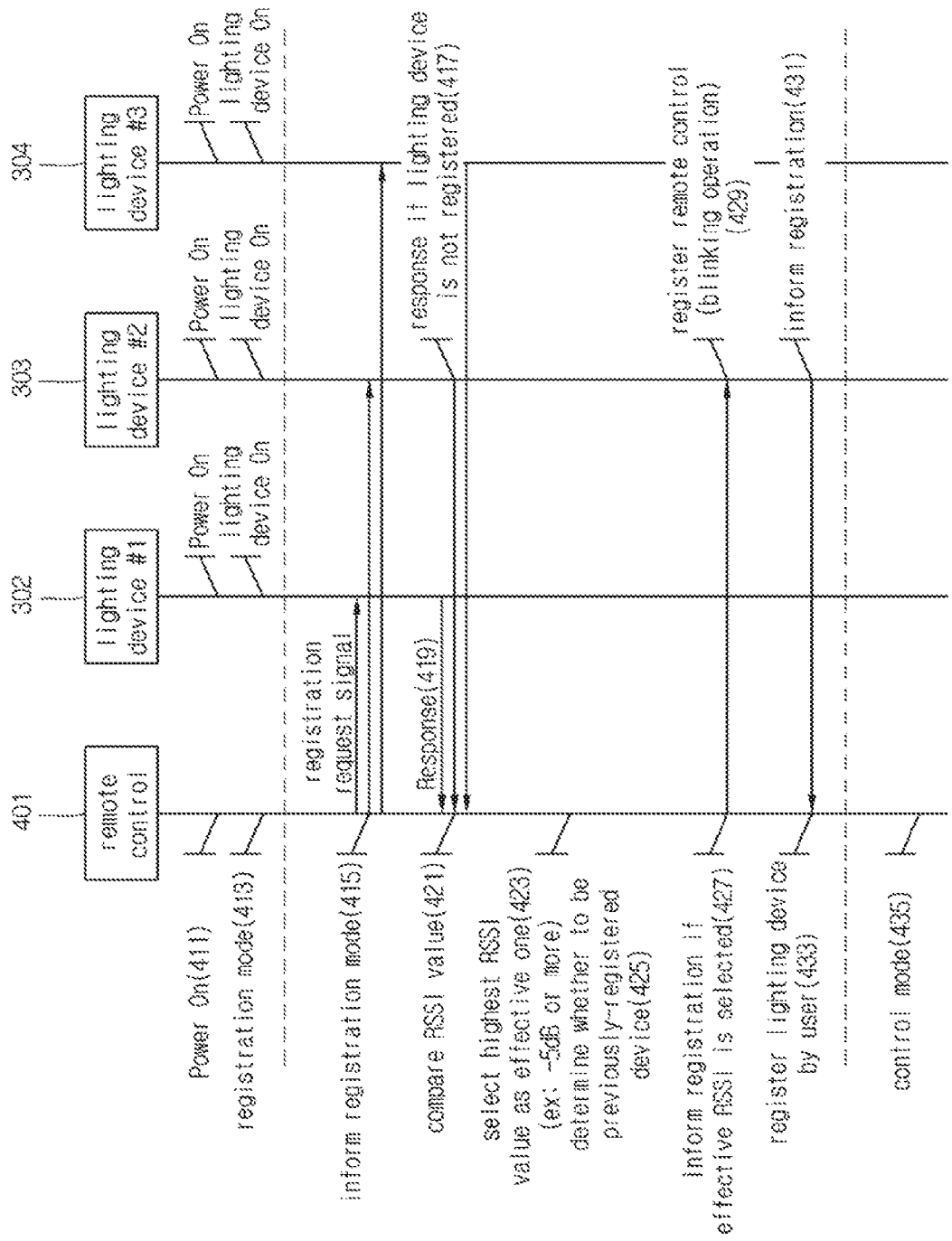
FIG. 6 is a flowchart showing the second example of the lighting control procedure according to the first embodiment.

FIG. 6 is a flowchart showing the second example of the lighting control procedure according to the first embodiment. According to the present embodiment, one lighting control apparatus 101 registers and controls a plurality of lighting devices 111. In addition, according to the present embodiment, a plurality of lighting control apparatuses 101 may register and control the same lighting device 111. Further, according to the present embodiment, the lighting control apparatus 101 is assumed as a remote control 401 for explanation.

Referring to FIG. 6, according to the lighting control procedure of the present embodiment, in the state that the remote control 401 and the lighting devices 302, 303, and 304 are powered on (step 411), the remote control 401 performs the registration mode (step 413). In this case, even though one of the lighting devices 302, 303, and 304 has been already registered in the remote control 401, the remote control 401 performs the registration mode. For example, the remote control 401 may perform the registration execution key, and may enter the registration mode corresponding to the selection of the registration execution key. Further, the remote control 401 may detect the power-on state to enter the registration mode. In this case, the remote control 401 enters the registration mode to perform the registration mode for a preset time (e.g., 1 second).

In detail, at the registration mode, the remote control 401 transmits a registration request signal to each of the lighting devices 302, 303, and 304 to inform each of the lighting devices 302, 303, and 304 that the remote control 401 is in the middle of performing the registration mode (step 415). If the registration request signal is received from the remote control 401, each of the lighting devices 302, 303, and 304 determines if the remote control 401 has been already registered (step 417). In addition, if the remote control 401 is not registered in the lighting devices 302, 303, and 304, each of the lighting devices 302, 303, and 304 transmits a response message corresponding to the registration request signal to the remote control 401 (step 419). In this case, the response message includes the identification data of each of the lighting devices 302, 303, and 304.

Next, if the response messages are received from the lighting devices 302, 303, and 304, the remote control 401 compares received signal strengths of the response messages with each other (step 421). In addition, the remote control 401 selects effective one from the received signal strengths of the response messages. In this case, the remote control 401 may select the highest one of the received signal strengths. In addition, the remote control 401 may compare the selected received signal strength with a previously-stored received signal strength. For example, if the previously-stored received signal strength is −5 dB, the remote control 401 may determine if the selected received signal strength is −5 dB or more. If the selected received signal strength is equal to or more than the previously-stored received signal strength, the remote control 401 may determine the selected received signal strength as effective one. Thereafter, the remote control 401 determines if the lighting device 303 corresponding to the effective received signal strength has been already registered (step 425).

Next, if the lighting device 303 corresponding to the effective received signal strength is not registered, the remote control 401 requests the registration of the remote control 401 at the lighting device 303 (step 427). If the registration of the remote control 401 is requested by the remote control 401, the lighting device 303 registers the remote control 401 (step 429). In this case, the lighting device 303 may perform a blinking operation. Next, the lighting device 303 informs the remote control 401 about the registration of the remote control 401 (step 431). Then, if the registration of the remote control 401 is confirmed from the lighting device 303, the remote control 401 registers the lighting device 303 and terminates the registration mode (step 433).

Next, the remote control 401 performs the control mode (step 435). In this case, the remote control 401 may control the registered lighting device 303 according to the user command.

Figure 7:
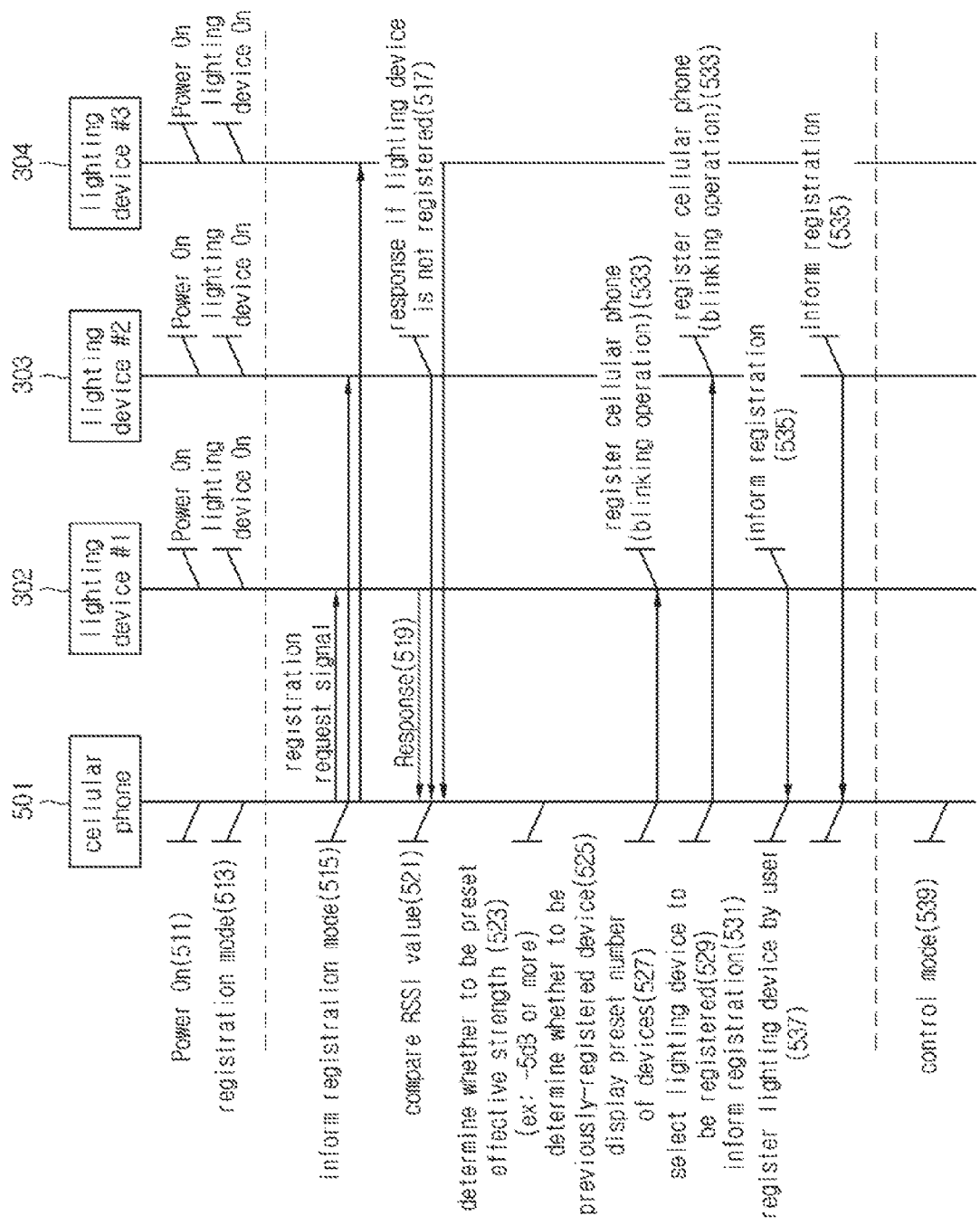
FIG. 7 is a flowchart showing the third example of the lighting control procedure according to the first embodiment.

FIG. 7 is a flowchart showing the third example of the lighting control procedure according to the first embodiment. According to the present embodiment, one lighting control apparatus 101 registers and controls a plurality of the lighting devices 111. In addition, according to the present embodiment, a plurality of lighting control apparatuses 101 may register and control the same lighting device 111. Further, according to the present embodiment, the lighting control apparatus 101 is assumed as a cellular phone 501 for explanation.

Referring to FIG. 7, according to the lighting control procedure of the present embodiment, in the state that the cellular phone 501 and the lighting devices 302, 303, and 304 are powered on (step 511), the cellular phone 501 performs the registration mode (step 513). In this case, even though one of the lighting devices 302, 303, and 304 has been already registered in the cellular phone 501, the cellular phone 501 performs the registration mode. For example, the cellular phone 501 may include the registration execution key, and may enter the registration mode corresponding to the selection of the registration execution key. Further, the cellular phone 501 may detect the power-on state to enter the registration mode. In this case, the cellular phone 501 enters the registration mode to perform the registration mode for a preset time (e.g., 1 second).

In detail, at the registration mode, the cellular phone 501 transmits a registration request signal to each of the lighting devices 302, 303, and 304 to inform each of the lighting devices 302, 303, and 304 that the cellular phone 401 is in the middle of performing the registration mode (step 515). If the registration request signal is received from the cellular phone 501, each of the lighting devices 302, 303, and 304 determines if the cellular phone 501 has been already registered (step 517). If the cellular phone 501 is not registered in the light emitting devices 302, 303, and 304, each of the light devices 302, 303, and 304 transmits a response message corresponding to the registration request signal to the cellular phone 501 (step 517). In this case, the response message includes identification data of each of the lighting devices 302, 303, and 304.

Next, if the response messages are received from the lighting devices 302, 303, and 304, the cellular phone 501 compares received signal strengths of the response messages with each other (step 521). In addition, the cellular phone 501 selects at least one effective received signal strength among the received signal strengths of the response messages (step 523). In this case, the cellular phone 501 may compare the received signal strengths with a previously-stored received signal strength. For example, if the previously-stored received signal strength is −5 dB, the cellular phone 501 may determine if at least one of the received signal strengths is −5 dB or more. If at least one of the received signal strengths is equal to or more than the previously-stored received signal strength, the cellular phone 501 may determine the related received signal strength as effective one. Thereafter, the cellular phone 501 determines if the lighting device 303 corresponding to the effective received signal strength has been already registered (step 525). Next, if the lighting devices 302 and 303 corresponding to the effective received signal strengths are not registered, the cellular phone 501 displays the lighting devices 302 and 303 (step 527). In this case, if a plurality of lighting devices 302 and 303 exist, the cellular phone 501 displays the lighting devices 302 and 303 by a preset number. Next, the cellular phone 501 selects at least one of the lighting devices 302 and 303 (step 529). Then, the cellular phone 501 requests the registration of the cellular phone 501 at the selected lighting devices 302 and 303 (step 531). If the registration of the cellular phone 501 is requested by the cellular phone 501, the selected lighting devices 302 and 303 register the cellular phone 501 therein (step 533). In this case, the selected lighting devices 302 and 303 may perform a blinking operation. Next, the lighting devices 302 and 303 inform the cellular phone 501 about the registration of the cellular phone 501 (step 535). If the registration of the cellular phone 501 is confirmed from the selected lighting devices 302 and 303, the cellular phone 501 registers the selected lighting devices 302 and 303 and terminates the registration mode (step 537). Next, the cellular phone 501 performs the control mode (step 539). In this case, the cellular phone 501 may control the registered lighting devices 302 and 303 according to the user command.

Meanwhile, although not shown, the lighting control apparatus 101 may delete the registered lighting device 111 after the control mode has been performed or before the control mode is performed. In this case, the lighting control apparatus 101 may request the deletion of the lighting control apparatus 101 at the registered lighting device 111. To this end, the lighting control apparatus 101 may include a registration delete key. In addition, if the registration delete key is selected, the lighting control apparatus 101 may request the registered lighting device 111 to delete the lighting control apparatus 101. If the deletion of the lighting control apparatus 101 is requested by the lighting control apparatus 101, the registered lighting device 111 may delete the lighting control apparatus 101. In addition, the lighting control apparatus 101 may delete the registered lighting device 111.

FIGS. 8 to 12 are views showing screen images displayed when the lighting control procedure is performed according to the first embodiment. The present embodiment will be described below by assuming the lighting control apparatus 101 as a cellular phone.

Referring to FIGS. 8 to 12, the lighting control apparatus 101 performs a registration mode on premises 113 to register the lighting device 111 of a living room 115 or a bed room 117. For example, the lighting control apparatus 101 may perform the registration mode in the living room 115.

Figure 8:
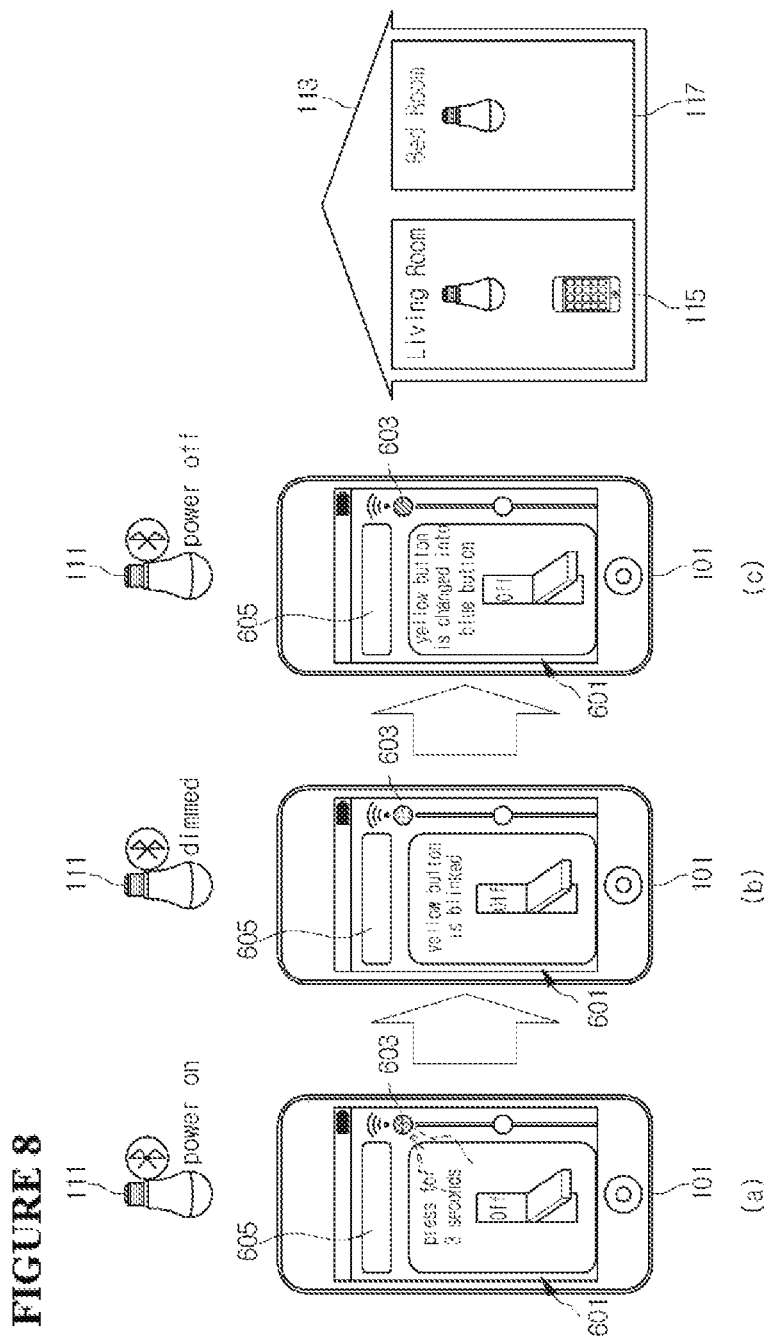
FIGS. 8 to 12 are views sowing screen images displayed when the lighting control procedure is performed according to the first embodiment.

In this case, at the registration mode, the lighting control apparatus 101 displays a display screen image 601 as shown in FIG. 8. The display screen image 601 includes a registration request key 603 and an input window 605. In addition, if the registration request key 603 is selected, the lighting control apparatus 101 transmits a registration request signal to the lighting device 111 as shown in FIG. 8(a). For example, if the registration request key 603 is selected for a preset time, for example, 3 seconds, the lighting control apparatus 101 may transmit the registration request signal to the lighting device 111. In this case, in the state that the lighting device 111 is turned on, the lighting control apparatus 101 may transmit the registration request signal. In addition, if the registration request signal is received from the lighting control apparatus 101, the lighting device 111 performs a blinking operation, and the registration request key 603 in the lighting control apparatus 101 performs the blinking operation in a yellow color as shown in FIG. 8(b). Thereafter, the lighting device 111 is turned off, so that the registration request key 603 in the lighting control apparatus 101 may be changed into a blue color as shown in FIG. 8(c).

Figure 9:
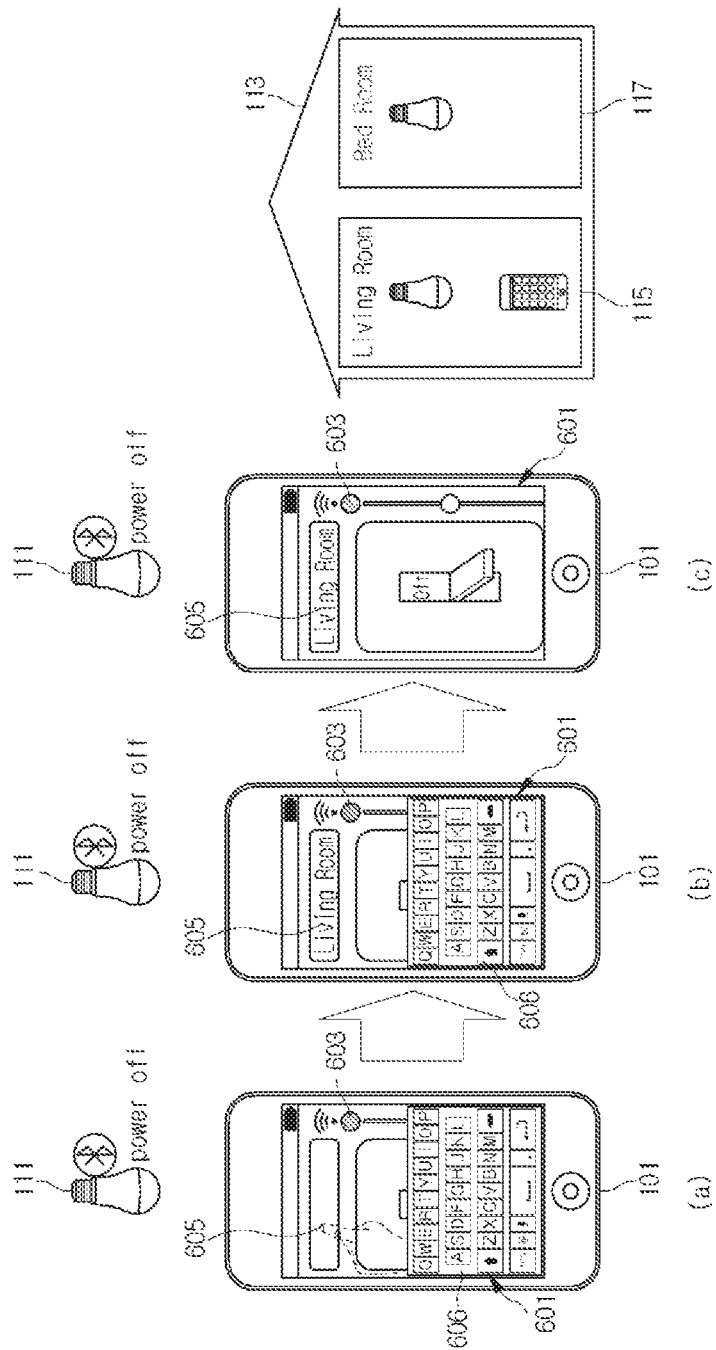

Thereafter, if the registration of the lighting device 111 is determined, the lighting control apparatus 101 inputs identification information of the lighting device 111 into the input window 605 as shown in FIG. 9. In detail, if the input window 605 is selected, the lighting control apparatus 101 additionally displays a character keypad 606 on the display screen image 601 together with the input window 605 as shown in FIG. 9(a). In addition, as characters are selected from the character keypad 606, the lighting control apparatus 101 inputs the identification information of the lighting device 111 into the input window 605 as shown in FIG. 9(b). For example, the lighting control apparatus 101 may input "Living Room" in the input window 605 as the identification information of the lighting device 111. In addition, if the input of the identification information of the lighting device 111 has been finished, the lighting control apparatus 101 removes the character keypad 606 from the display screen image 601 as shown in FIG. 9(c).

Accordingly, the lighting control apparatus 101 may perform the control mode in the premises 113 to control the lighting device 111 of the living room 115 or the bed room 117. For example, the lighting control apparatus 101 may perform the control mode in the living room 115.

Figure 10:
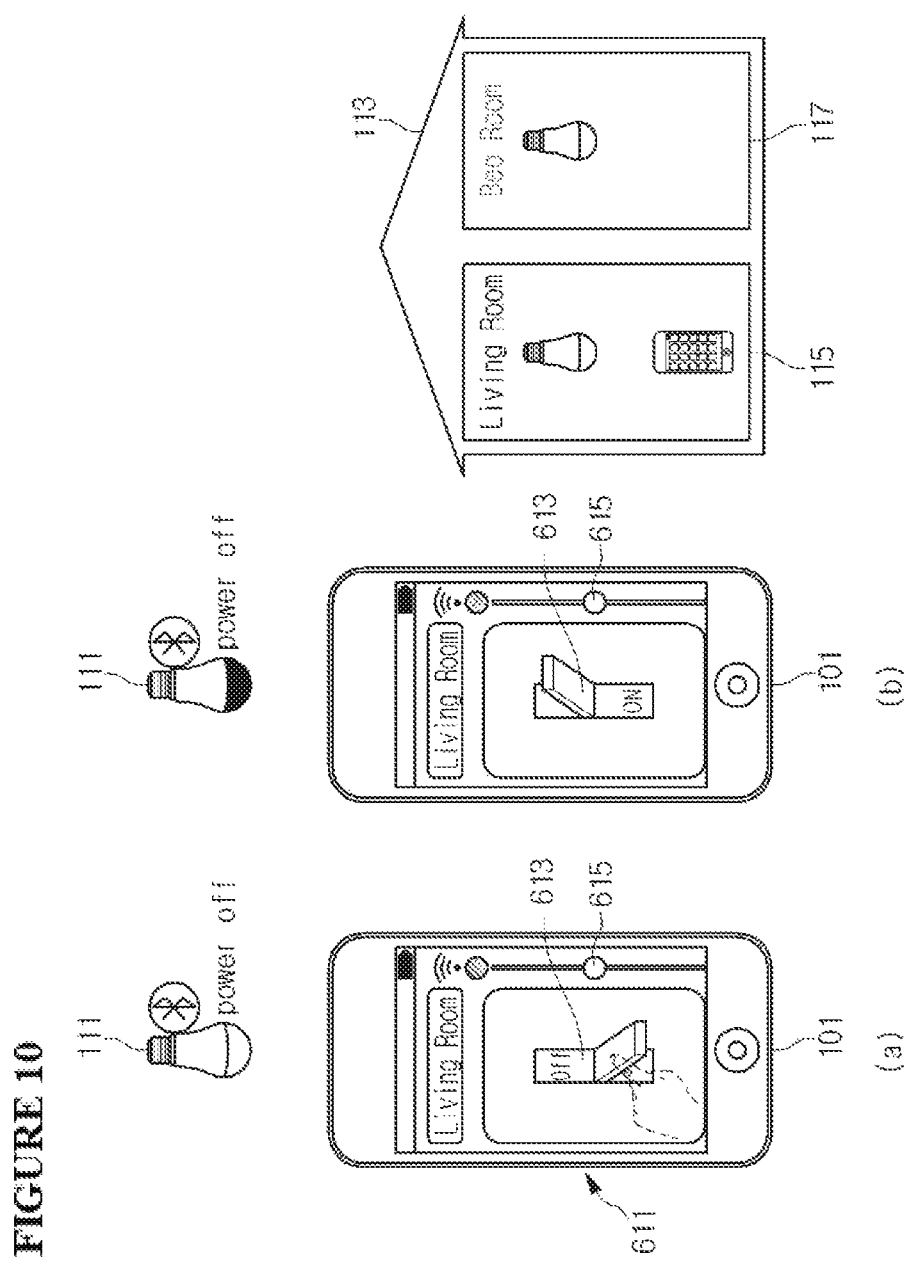

In this case, at the control mode, the lighting control apparatus 101 displays the display screen image 611 as shown in FIG. 10. The display screen image 611 includes an on/off switch 613 and a control unit 615. The on/off switch 613 is used to turn on or turn off the lighting device 111, and the control unit 615 controls the diming of the lighting device 111. In other words, if the on/off switch 613 is selected, the lighting control apparatus 101 turns on the lighting device 111 as shown in FIG. 10(a), or turns off the lighting device 111 as shown in FIG. 10(b). In addition, if the control unit 615 is adjusted, the lighting control apparatus 101 detects the adjustment value of the control unit 615 to control the diming of the lighting device 111 corresponding to the adjustment value.

Figure 11:
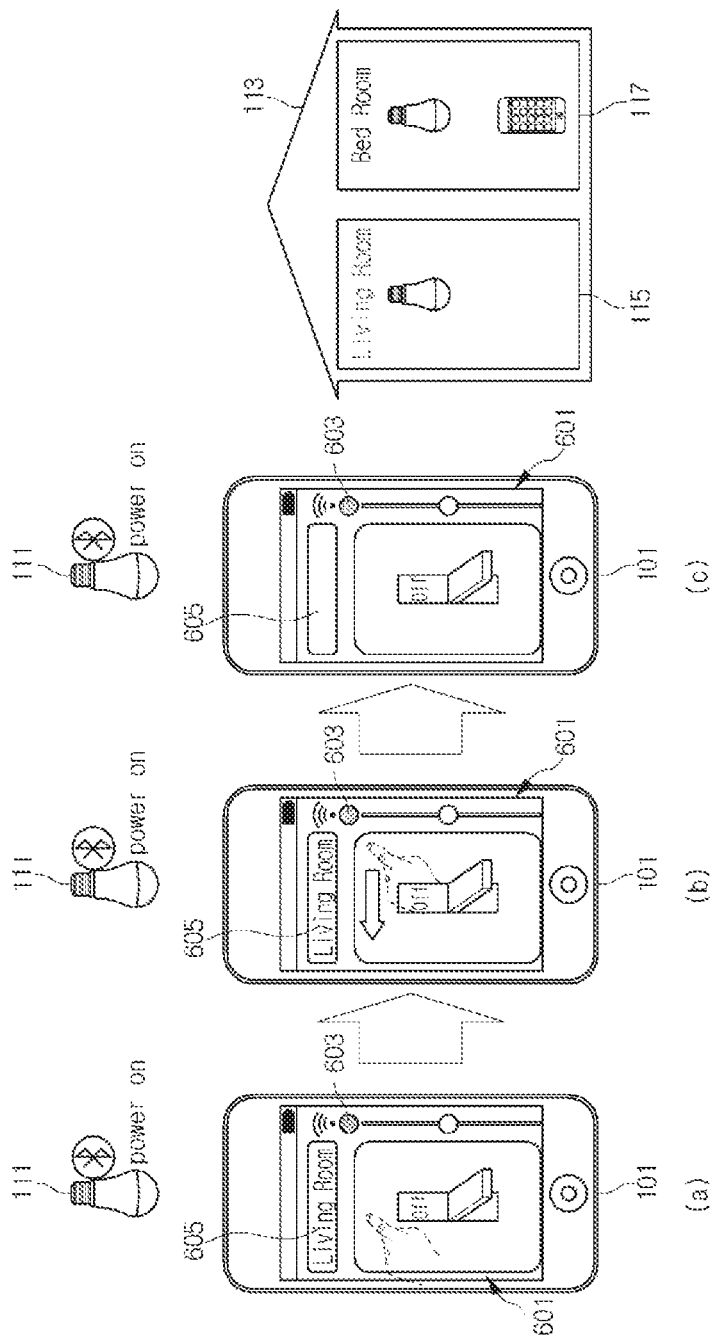

Meanwhile, at the registration mode, after the lighting device 111 of the living room 115 has been registered, the lighting control apparatus 101 may additionally register the lighting device 111 of the bed room 117. To this end, at the registration mode, the lighting control apparatus 101 changes a preset display screen image 601 to a new display screen image 601 to be displayed as shown in FIG. 11. For example, if a touch is detected for a preset time on the present display screen image 601 as shown in FIG. 11(a), or a drag is detected for the preset time on the present display image 601 as shown in FIG. 11(b), the lighting control apparatus 101 may display the new display screen image 601 as shown in FIG. 11(c). Thereafter, the lighting control apparatus 101 may register the lighting device 111 of the bed room 117 by using the display screen image 601.

Figure 12:
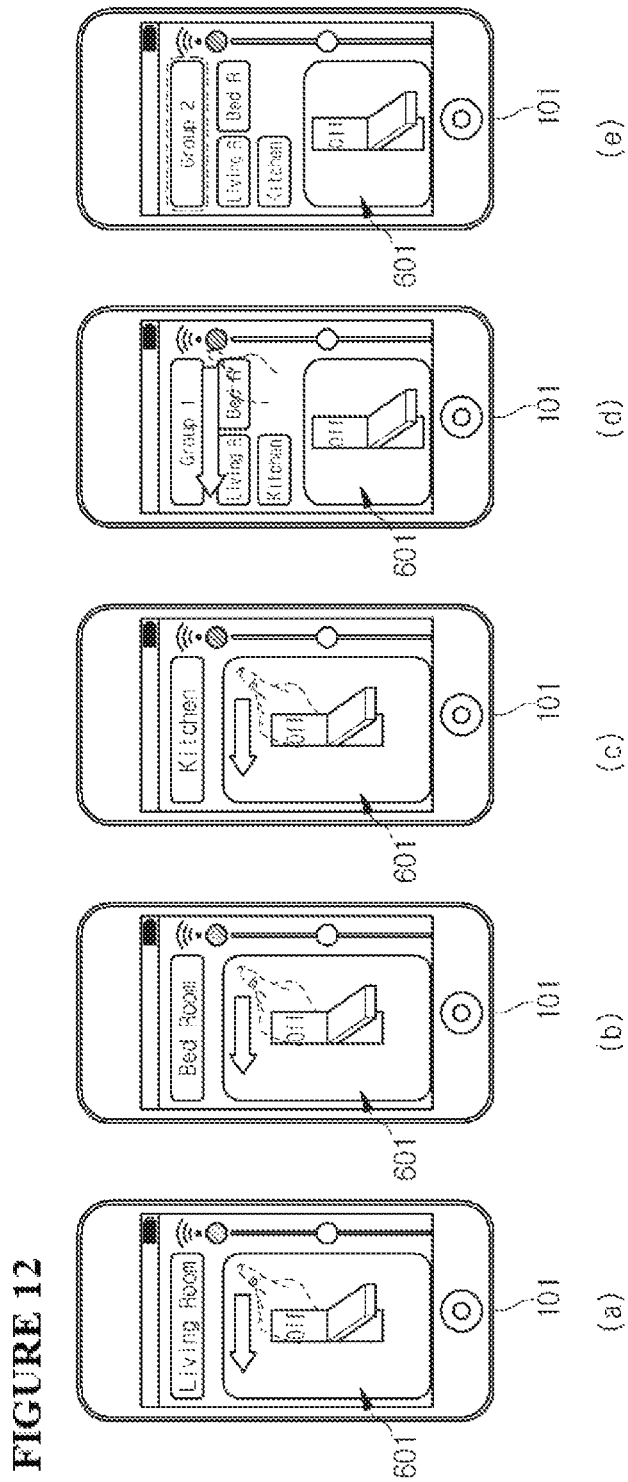

In addition, the lighting control apparatus 101 may register a plurality of lighting devices 111 as shown in FIG. 12 by repeatedly the above procedure. In other words, the lighting control apparatus 101 may individually register the lighting devices 111 as shown in FIGS. 12(a), 12(b), and 12(c). In this case, the lighting control apparatus 101 may register the lighting devices 111 by grouping the lighting devices 111 as shown in FIGS. 12(d) and 12(e). For example, the lighting control apparatus 101 may individually register the lighting devices 111 while automatically grouping the lighting devices 111. In addition, after the lighting control apparatus 101 individually registers the lighting devices 111, the lighting control apparatus 101 may group the lighting devices 111 by selecting at least one of the lighting devices 111 through the display screen images 601 corresponding to the lighting devices 111. Accordingly, the lighting control apparatus 101 may divide the lighting devices 111 into at least one group, for example, a first group or a second group.

Figure 13:
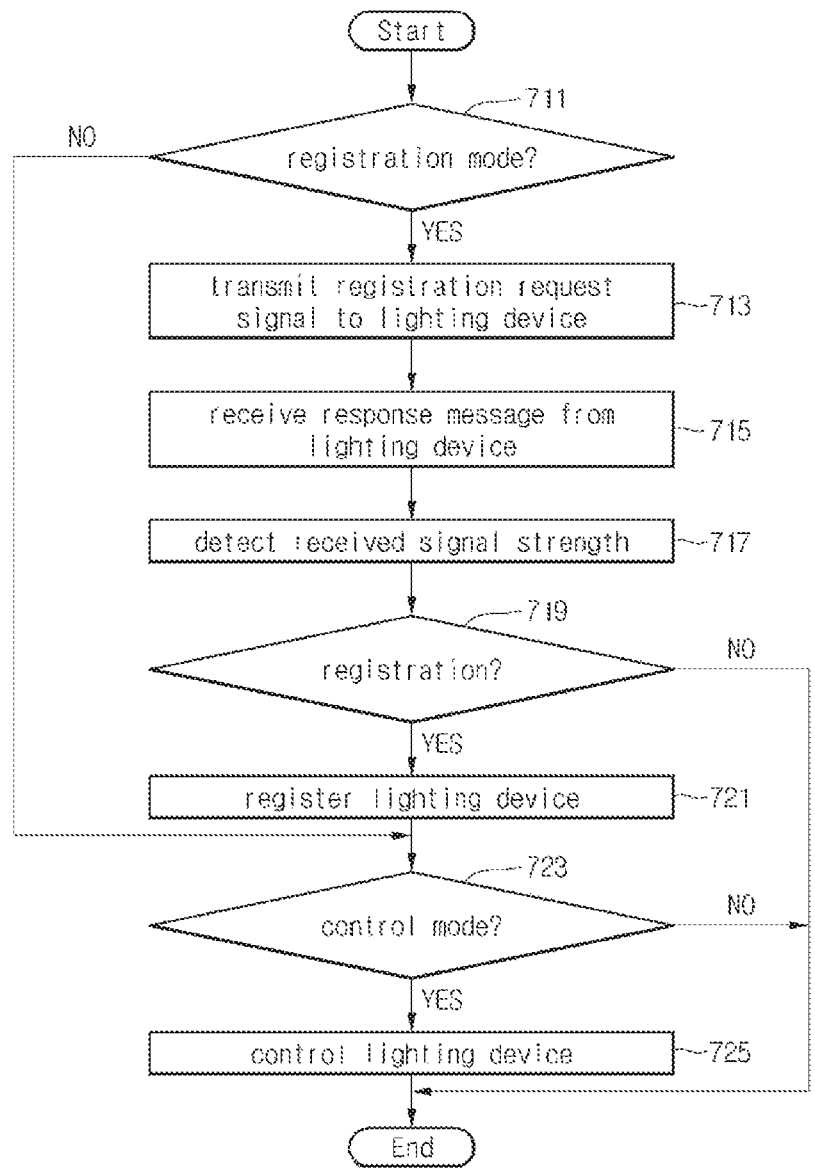
FIG. 13 is a flowchart showing the lighting control procedure of the lighting control apparatus according to the first embodiment.

FIG. 13 is a flowchart showing the lighting control procedure of the lighting control apparatus according to the first embodiment.

Referring to FIG. 13, according to the present embodiment, the lighting control procedure of the lighting control apparatus 101 is commenced from that the control module 202 of the lighting control apparatus 101 detects the registration mode in step 711. For example, the lighting control apparatus 101 may include a registration execution key, and the control module 202 may enter the registration mode corresponding to the selection of the registration execution key. In addition, the control module 202 may enter the registration mode by detecting the power-on state of the lighting control apparatus 101. In addition, if the registration mode is detected, the control module 202 transmits a registration request signal to the lighting device 111 in step 713 to inform the lighting device 111 that the control module 202 performs the registration mode. Thereafter, the control module 202 receives a response message from the lighting device 111 corresponding to the registration request signal in step 715. In this case, the response message includes the identification data of the lighting device 111. In addition, the control unit 202 detects a received signal strength of the response message in step 717.

Thereafter, the control module 202 determines the registration of the lighting device 111 according to the received signal strength of the response message in step 719. In this case, the control module 202 may compare the received signal strength of the response message with a previously-stored received signal strength. In addition, if the received signal strength of the response message is equal to or more than the previously-stored received signal strength, the control module 202 may determine to register the lighting device 111. Further, the control module 202 may compare the received signal strength of the response message with the received signal strength of the response message received from another lighting device 111. In addition, if the received signal strength of the response message is equal to or more than the received signal strength of the response message received from another lighting device 111, the control module 202 may determine to register the lighting device 111.

Subsequently, the registration of the lighting device 111 is determined in step 719, the control module 202 registers the lighting device 111 in step 721. In this case, the control module 202 may request the registration of the lighting control apparatus 101 at the lighting device 111. Thereafter, if the registration of the lighting control apparatus 101 is confirmed from the lighting device 111, the control module 202 may register the lighting device 111, and the control module 202 may terminate the registration mode.

Finally, if the control mode is detected in step 723, the control module 202 controls the lighting device 111 in step 725. In this case, the control module 202 may turn on or turn off the registered lighting device 111, or may control the dimming operation of the registered lighting device 111.

Meanwhile, according to the second embodiment, the lighting control apparatus 101 performs the registration mode to register one of the lighting devices 111 as a reference lighting device 111. Further, the lighting control apparatus 101 may control the reference lighting device 111 at the registration mode to additionally register at least one of other lighting devices 111. Thereafter, the lighting control apparatus 101 performs the control mode to control the registered lighting device 111. In this case, the lighting control apparatus 101 may turn on or turn off the registered lighting device 111, or control the dimming operation of the registered lighting device 111.

Figure 14:
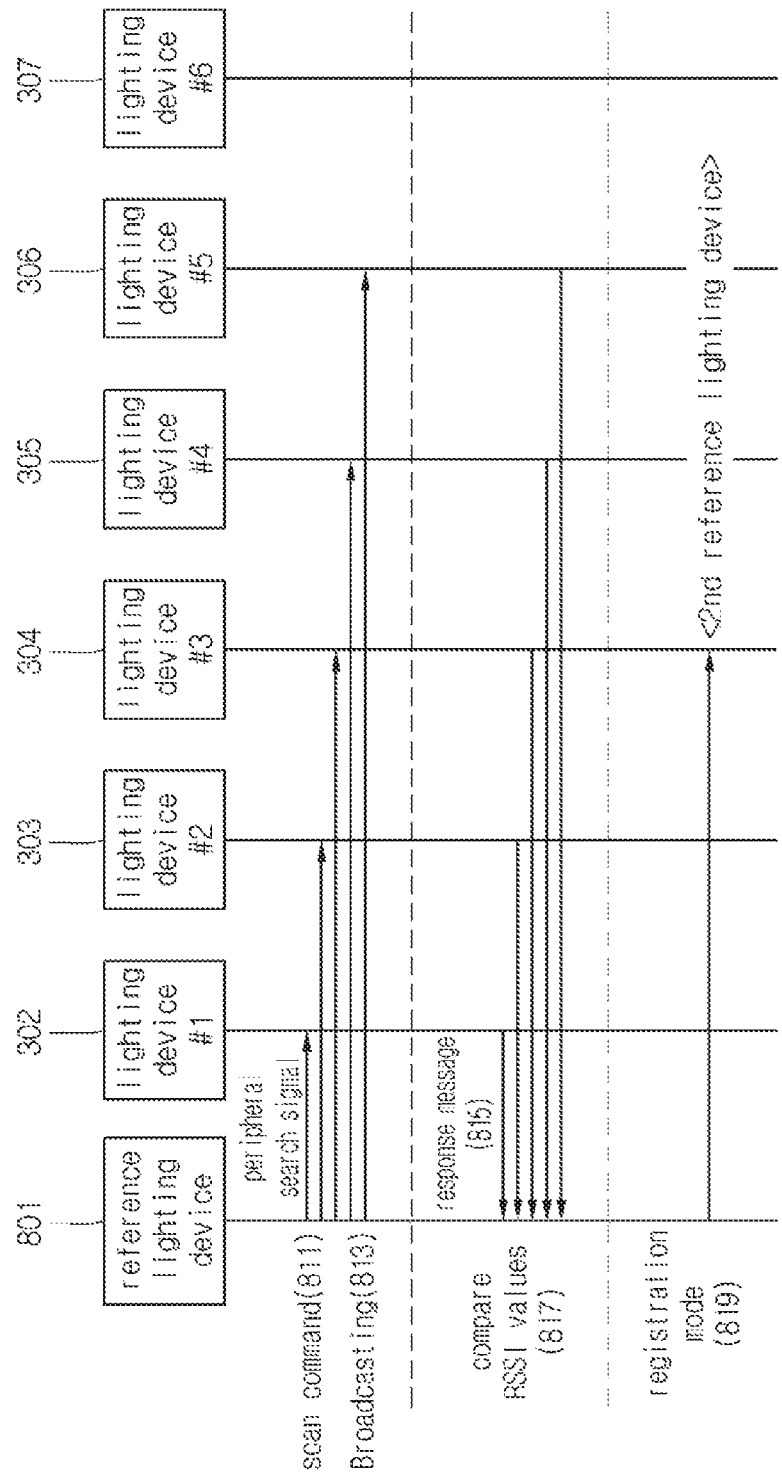
FIG. 14 is a flowchart showing the lighting control procedure according to the second embodiment.

FIG. 14 is a flowchart showing the lighting control procedure according to the second embodiment.

Referring to FIG. 14, according to the light control procedure of the present embodiment, in the state that the lighting control apparatus 101 and lighting devices 301, 302, 303, 304, 305, 306, and 307 are powered on, a reference lighting device 801 performs a registration mode under the control of the lighting control apparatus 101. In this case, one of the lighting devices 301 to 307 is previously registered as the reference lighting device 801 in the lighting control apparatus 101.

In detail, the reference lighting device 801 broadcasts peripheral search signals according to the scan command of the lighting control apparatus 101 (steps 811 and 813), in this case, the scan command may be directly sent from the lighting control apparatus 101 to the reference lighting device 801. In addition, the scan command may be sent from the lighting control apparatus 101 to the reference lighting device 801 through the relay device 105. In addition, the reference lighting device 801 transmits the peripheral search signals corresponding to the scan command. In addition, the peripheral lighting devices 302 to 306 receive the peripheral search signals. In this case, the peripheral lighting devices 302 to 306 represent at least one of other lighting devices 302 to 307 adjacent to the reference lighting device 801. Thereafter, the peripheral lighting devices 302 to 306 transmit response messages corresponding to the peripheral search signals to the reference lighting device 801 (step 815). In this case, the response messages include the identification data of the peripheral lighting devices 302, 303, 304, 305, and 306.

Next, if the response messages are received from the peripheral lighting devices 302, 303, 304, 305, and 306, the reference lighting device 801 compares received signal strengths of the response messages with each other (step 817). Then, the reference lighting device 801 registers at least one of the peripheral lighting devices 302, 303, 304, 305, and 306 according to the comparison result (step 819).

Figure 15:
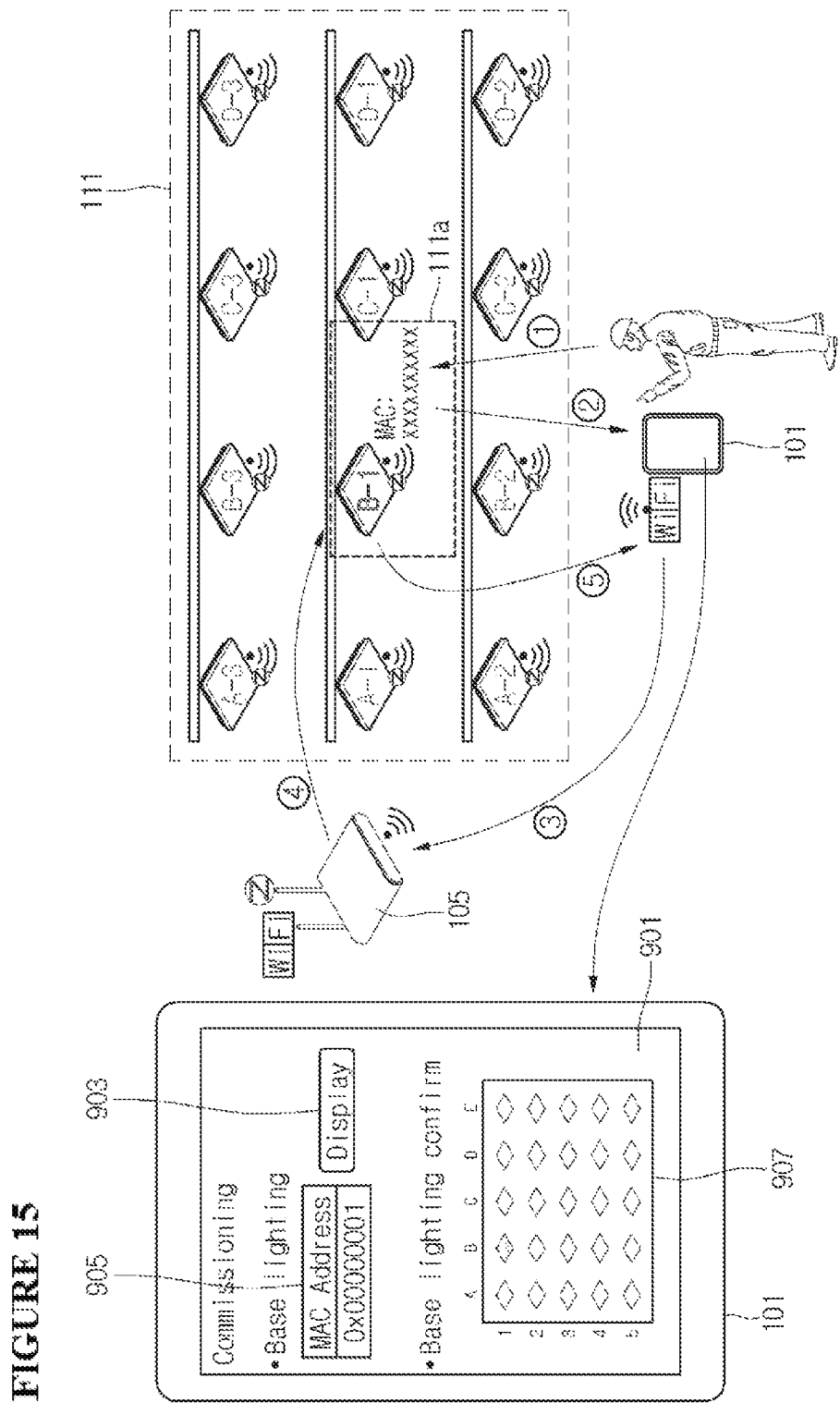
FIG. 15 is a view to explain the process of registering a first reference lighting device in the lighting control procedure according to the second embodiment.
Figure 16:
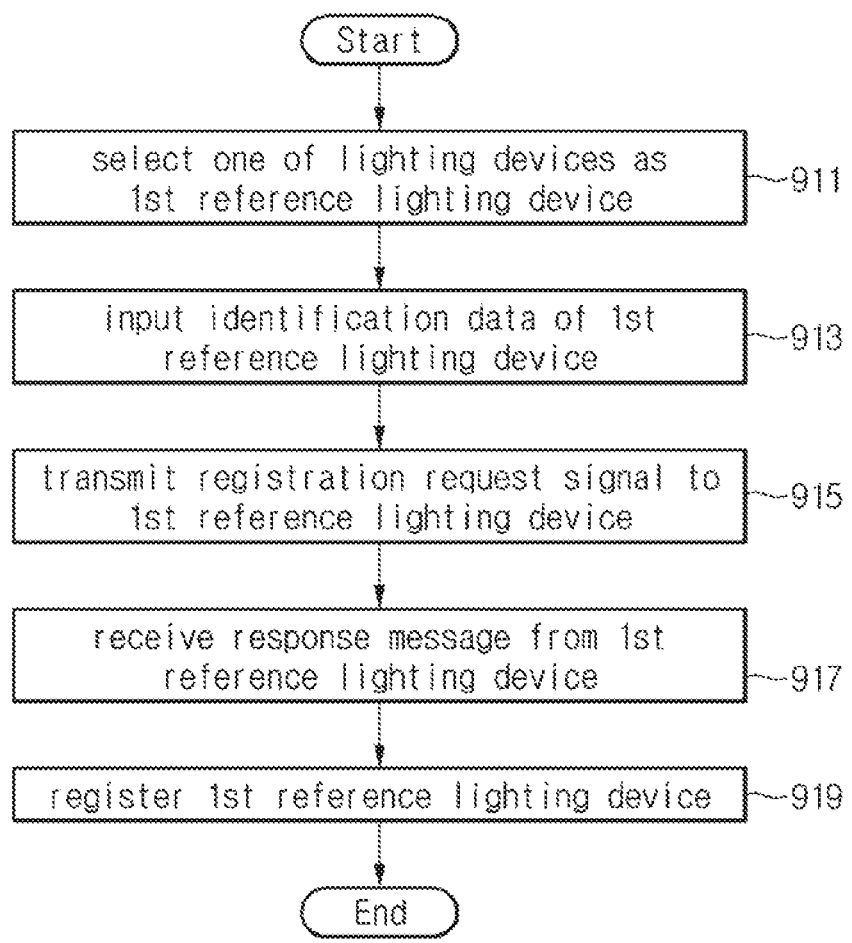
FIG. 16 is a flowchart showing the process of registering the first reference lighting device in the lighting control procedure according to the second embodiment.

FIG. 15 is a view to explain the process of registering a first reference lighting device in the lighting control procedure according to the second embodiment. FIG. 16 is a flowchart showing the process of registering the first reference lighting device in the lighting control procedure according to the second embodiment.

Referring to FIGS. 15 and 16, the lighting control apparatus 101 registers a first reference lighting device 111*a* at the registration mode, in this case, at the registration mode, the lighting control apparatus 101 displays a first display screen image 901. The first display screen image 901 includes a registration request key 903, an input window 905, and a position display window 907.

In detail, at the registration mode, the lighting control apparatus 101 selects one of the lighting devices 111 as the first reference lighting device 111*a* in step 911. In addition, a user of the lighting control apparatus 101 may check identification data of desired one selected from the lighting devices 111 (①), and input the identification data into the lighting control apparatus 101 (②). Next, as the identification data are input, the lighting control apparatus 101 displays the identification data on the input window 905 in step 913. In addition, the lighting control apparatus 101 may display the first reference lighting device 111*a* on the position display window 907.

Next, if the registration request key 903 is selected, the lighting control apparatus 101 transmits a registration request signal to the first reference lighting device 111*a* in step 915 (③ and ④). In this case, the lighting control apparatus 101 transmits the registration request signal to the first reference lighting device 111*a* by using the identification data of the first reference lighting device 111*a*. In addition, the lighting control apparatus 101 may directly transmit the registration request signal to the first reference lighting device 111*a*. Alternatively, the lighting control apparatus 101 may transmit the registration request signal to a relay device 105 (③) and the relay device 105 may transmit the registration request signal to the first reference lighting device 111*a* (④).

Next, if the registration request signal is received from the lighting control apparatus 101, the first reference lighting device 111*a* transmits a response message corresponding to the registration request signal to the lighting control apparatus 101 in step 917 (⑤). In this case, the first reference lighting device 111*a* may perform a blinking operation before or after the registration mode is transmitted. Next, the first reference lighting device 111*a* may directly transmit the response message to the lighting control apparatus 101. Alternatively, the first reference lighting device 111*a* may transmit the response message to the relay device 105, and the relay device 105 may transmit the response message to the lighting control apparatus 101. In addition, if the response message is received from the first reference lighting device 111*a*, the lighting control apparatus 101 registers the first reference lighting device 111*a* in step 919.

Meanwhile, the present embodiment discloses an example that the lighting control apparatus 101 selects and registers one of the lighting devices 111 according to the user command, but the embodiment is not limited thereto. In other words, the lighting control apparatus 101 may select and register the first reference lighting device 111*a* according to the previous embodiment. In detail, if the registration request key 903 is selected, the lighting control apparatus 101 may transmit the registration request signal to the lighting devices 111. Thereafter, the lighting control apparatus 101 may select and register one of the lighting devices 111 as the first reference lighting device 111*a* according to the received signal strengths of the response messages received from the lighting devices 111.

Figure 17:
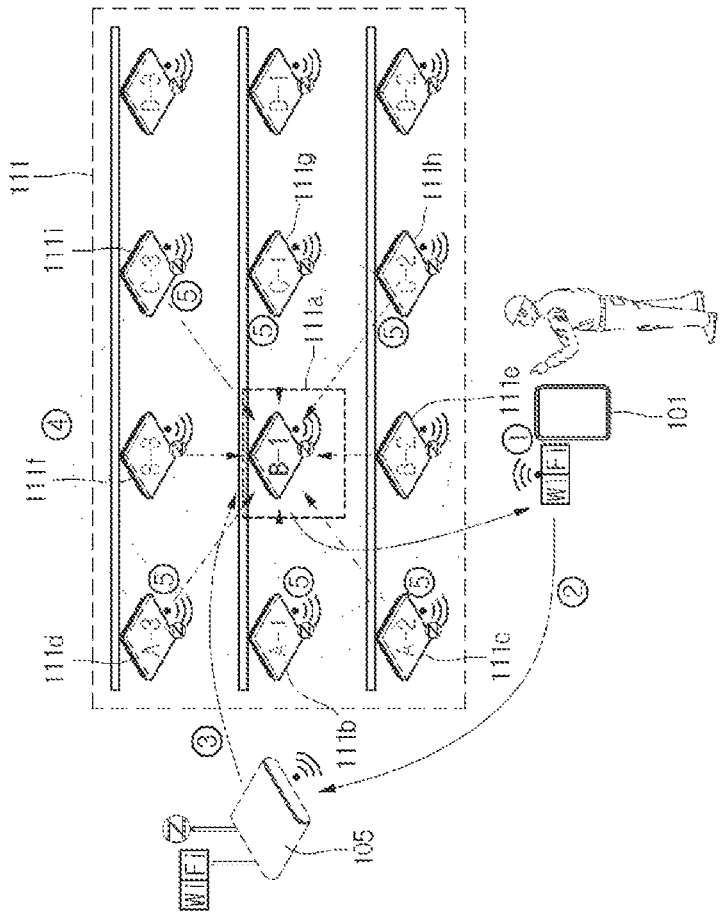
FIG. 17 is a view to explain the process of scanning peripheral lighting devices in the lighting control procedure according to the second embodiment.
Figure 18:
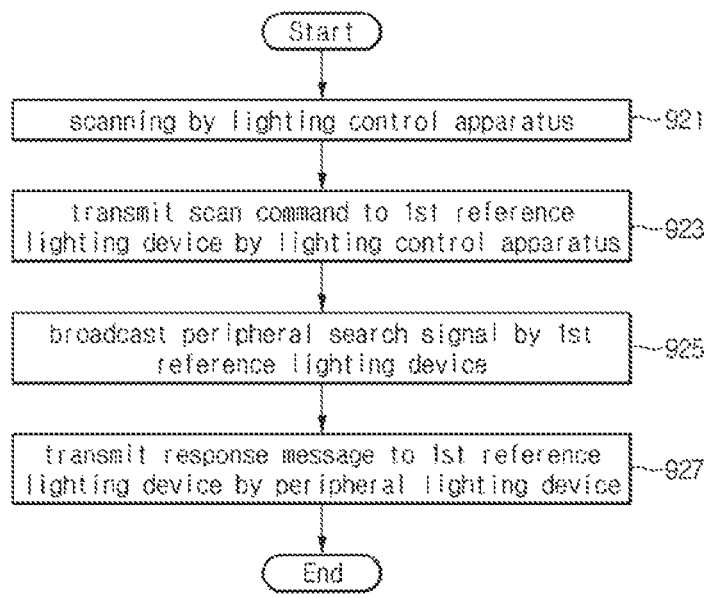
FIG. 18 is a flowchart showing the process of scanning the peripheral lighting devices in the lighting control procedure according to the second embodiment.

FIG. 17 is a view to explain the process of scanning peripheral lighting devices in the lighting control procedure according to the second embodiment. FIG. 18 is a flowchart showing the process of scanning the peripheral lighting devices in the lighting control procedure according to the second embodiment. FIG. 19 is a view to explain a data format of a peripheral search signal of a first reference lighting device of FIG. 18, and FIG. 20 is a view to explain a data format of a response message of the peripheral lighting device of FIG. 18.

Referring to FIGS. 17 and 18, the lighting control apparatus 101 scans peripheral lighting devices 111b, 111c, 111d, 111e, 111f, 111g, 111h, and 111i at the registration mode. In this case, the lighting control apparatus 101 scans the peripheral lighting devices 111b, 111c, 111d, 111e, 111f, 111g, 111h, and 111i by using the first reference lighting device 111a.

In detail, at the registration mode, the lighting control apparatus 101 performs a scan function in step 921 (①). Then, the lighting control apparatus 101 transmits a scan command to the first reference lighting device 111a in step 923 (② and ③). In this case, the lighting control apparatus 101 may directly transmit the scan command to the first reference lighting device 111a. Alternatively, the lighting control apparatus 101 may transmit the scan command to the relay device 105 (②), and the relay device 105 may transmit the scan command to the first reference lighting device 111a (③).

Next, if the scan command is received, the first reference lighting device 111a broadcasts peripheral search signals in step 925 (④). In this case, each peripheral search signal may have the data format shown in FIG. 19. In other words, the peripheral search signal may have fields representing 'Packet Length', 'Destination Address', 'Source Address', 'Command', and 'Payload'. In this case, the Destination Address may include identification data of each of the peripheral lighting devices 111b, 111c, 111d, 111e, 111f, 111g, 111h, and 111i, and the Source Address may include identification data of the first reference lighting device 111a. The Command may include a command to request the received signal strength of the peripheral search signal.

Next, if the peripheral search signal is received, the peripheral lighting devices 111b, 111c, 111d, 111e, 111f, 111g, 111h, and 111i transmit response messages corresponding to the peripheral search signals to the first reference lighting device 111a in step 927 (⑤). In this case, the peripheral lighting devices 111b, 111c, 111d, 111e, 111f, 111g, 111h, and 111i may measure received signal strengths of the peripheral search signals, and the response messages may include the received signal strengths of the peripheral search signals. In addition, the response message may have the data format shown in FIG. 20. In other words, the response message may have fields representing 'Packet Length', 'Destination Address', 'Source Address', 'Command', and 'Payload', respectively. In this case, the Destination Address may include identification data of the first reference lighting device 111a, the Source Address may include identification data of each of the peripheral lighting devices 111b, 111c, 111d, 111e, 111f, 111g, 111h, and 111i, and the Command may include the presence state of the received signal strength of the peripheral search signal. The Payload may represent the received signal strength of the peripheral search signal.

Figure 21:
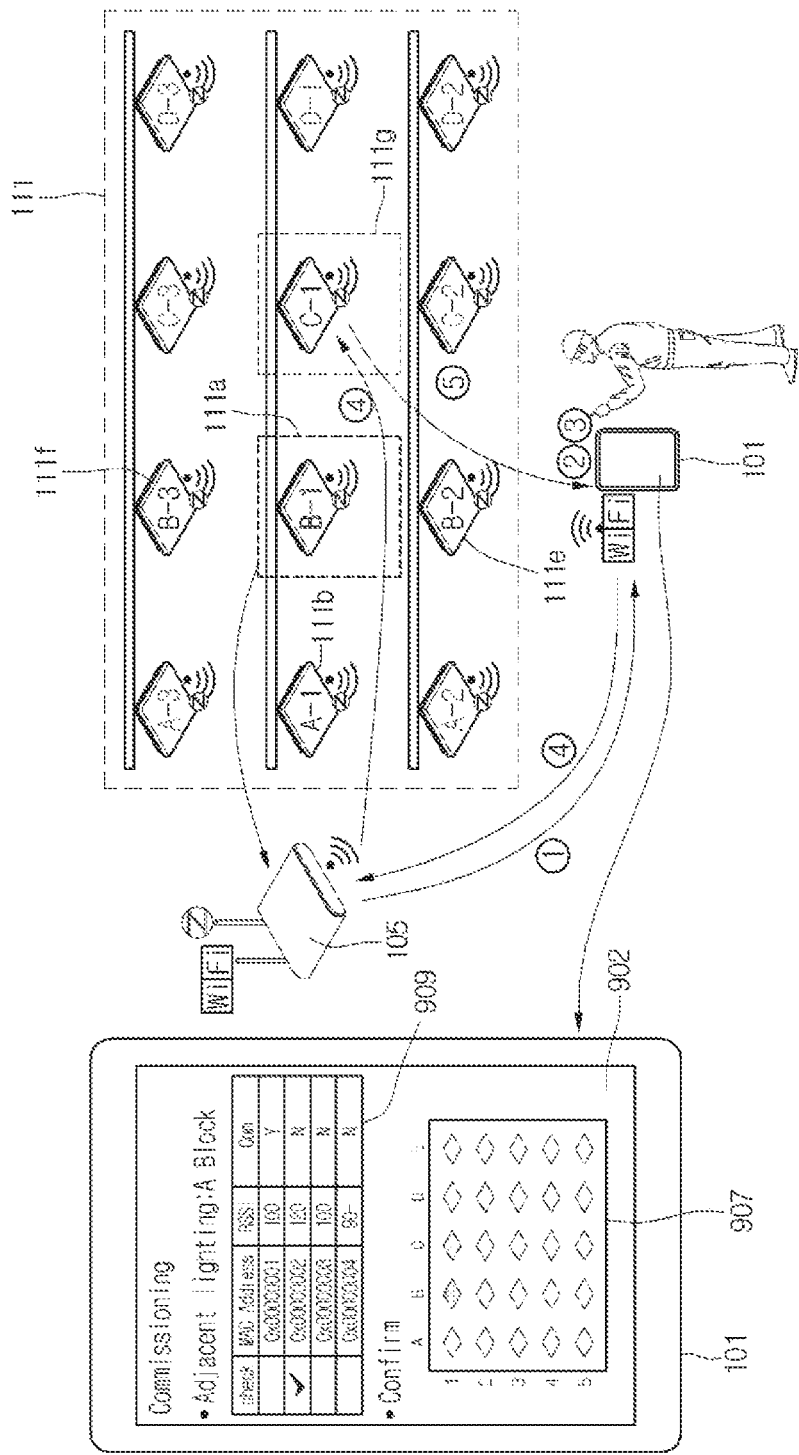
FIG. 21 is a view to explain the process of registering a second reference lighting device in the lighting control procedure according to the second embodiment.
Figure 22:
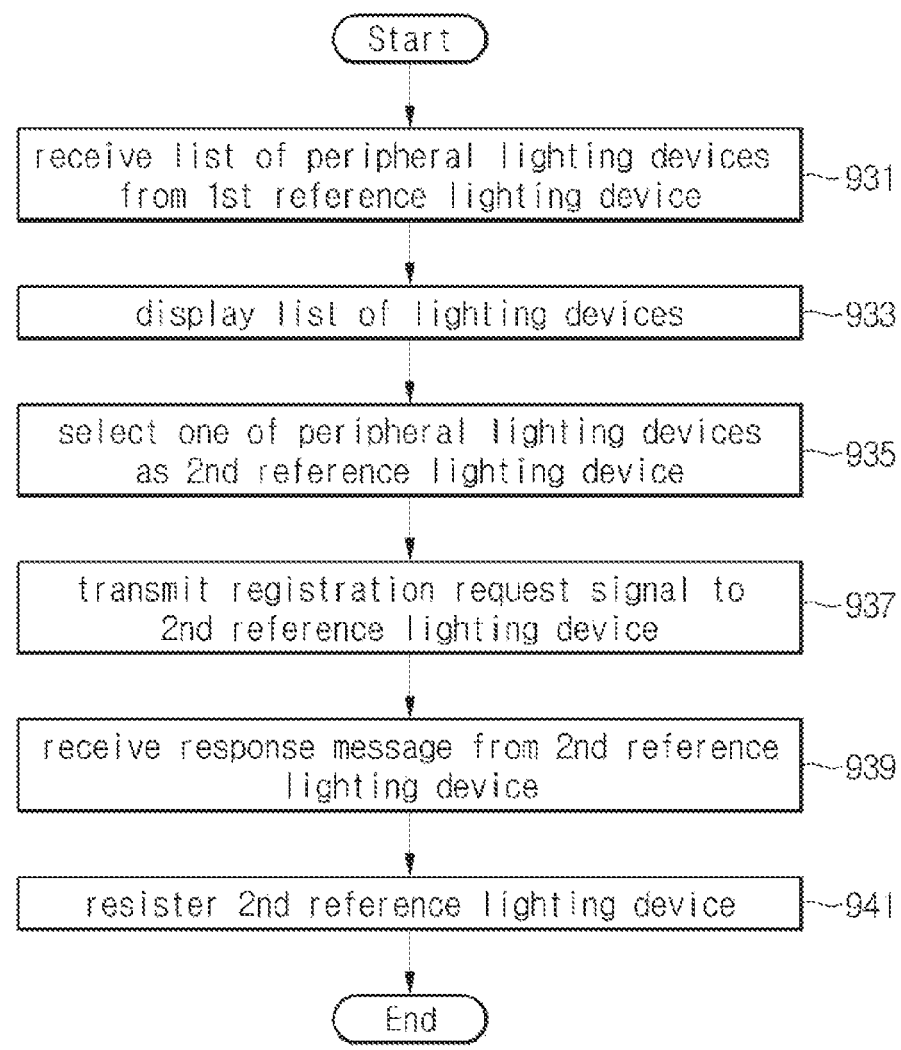
FIG. 22 is a flowchart showing the process of registering the second reference lighting device in the lighting control procedure according to the second embodiment.

FIG. 21 is a view to explain the process of registering a second reference lighting device in the lighting control procedure according to the second embodiment. FIG. 22 is a flowchart showing the process of registering the second reference lighting device in the lighting control procedure according to the second embodiment.

Referring to FIGS. 21 and 22, the lighting control apparatus 101 registers one of the peripheral lighting devices 111b, 111c, 111d, 111e, 111f, 111g, 111h, and 111i as a second reference lighting device 111g at the registration mode. In this case, at the registration mode, the lighting control apparatus 101 displays a second display screen image 902. The second display screen image 902 displays a list 909 of the lighting devices 111a, 111b, 111c, 111d, 111e, 111f, 111g, 111h, and 111i and a position display window 907.

In detail, at the registration mode, the lighting control apparatus 101 receives the list of the peripheral lighting devices 111b, 111c, 111d, 111e, 111f, 111g, 111h, and 111i from the first reference lighting device 111a in step 931 (①). In other words, if the response messages corresponding to the peripheral search signals are received from the peripheral lighting devices 111b, 111c, 111d, 111e, 111f, 111g, 111h, and 111i, the first reference lighting device 111a transmits the list of the peripheral lighting devices 111b, 111c, 111d, 111e, 111f, 111g, 111h, and 111i to the lighting control apparatus 101. In this case, if the response message includes the received signal strength of the peripheral search signal, the first reference lighting device 111a may transmit the received signal strength of the peripheral search signal to the lighting control apparatus 101. If the response message does not include the received signal strength of the peripheral search signal, the first reference lighting device 111a may measure the received signal strength of the response message and transmit the received signal strength of the response message to the lighting control apparatus 101.

Next, the lighting control apparatus 101 displays the list 909 of the lighting devices 111a, 111b, 111c, 111d, 111e, 111f, 111g, 111h, and 111i in step 933 (②). In this case, the lighting control apparatus 101 may display the selection state, the identification data, the received signal strength, and the registration state with respect to each of the first reference lighting device 111a and the peripheral lighting devices 111b, 111c, 111d, 111e, 111f, 111g, 111h, and 111i.

Then, the lighting control apparatus 101 selects one of the peripheral lighting devices 111b, 111c, 111d, 111e, 111f, 111g, 111h, and 111i as the second reference lighting device 111g in step 935 (③). In this case, the lighting control apparatus 101 may select the second reference lighting device 111g by comparing the peripheral lighting devices 111b, 111c, 111d, 111e, 111f, 111g, 111h, and 111i with each other. In addition, the lighting control apparatus 101 may select the second reference lighting device 111g as a user of the lighting control apparatus 101 checks the lift 909 and makes a selection. Next, the lighting control apparatus 101 may display the second reference lighting device 111g on the display window 907. Thereafter, the lighting control apparatus 101 transmits a registration request signal to the second reference lighting device 111g in step 937 (④). In this case, the lighting control apparatus 101 transmits the registration request signal by using identification data of the second reference lighting device 111g. In addition, the lighting control apparatus 101 may directly transmit the registration request signal to the second reference lighting device 111g. Alternatively, the lighting control apparatus 101 may transmit the registration request signal to the relay device 105, and the relay device 105 may transmit the registration request signal to the first reference lighting device 111a.

Next, if the registration request signal is received from the lighting control apparatus 101, the second reference lighting device 111g transmits a response message corresponding to the registration request signal to the lighting control apparatus 101 in step 939 (⑤). In this case, the second reference lighting device 111g may perform a dimming operation before or after the response message is transmitted. In addition, the second reference lighting device 111g may directly transmit the response message to the lighting control apparatus 101. Alternatively, the second reference lighting device 111g may transmit the response message to the relay device 105, and the relay device 105 may transmit the response message to the lighting control apparatus 101. In addition, if the response message is received from the second reference lighting device 111g, the lighting control apparatus 101 registers the second reference lighting device 111g in step 941.

Figure 23:
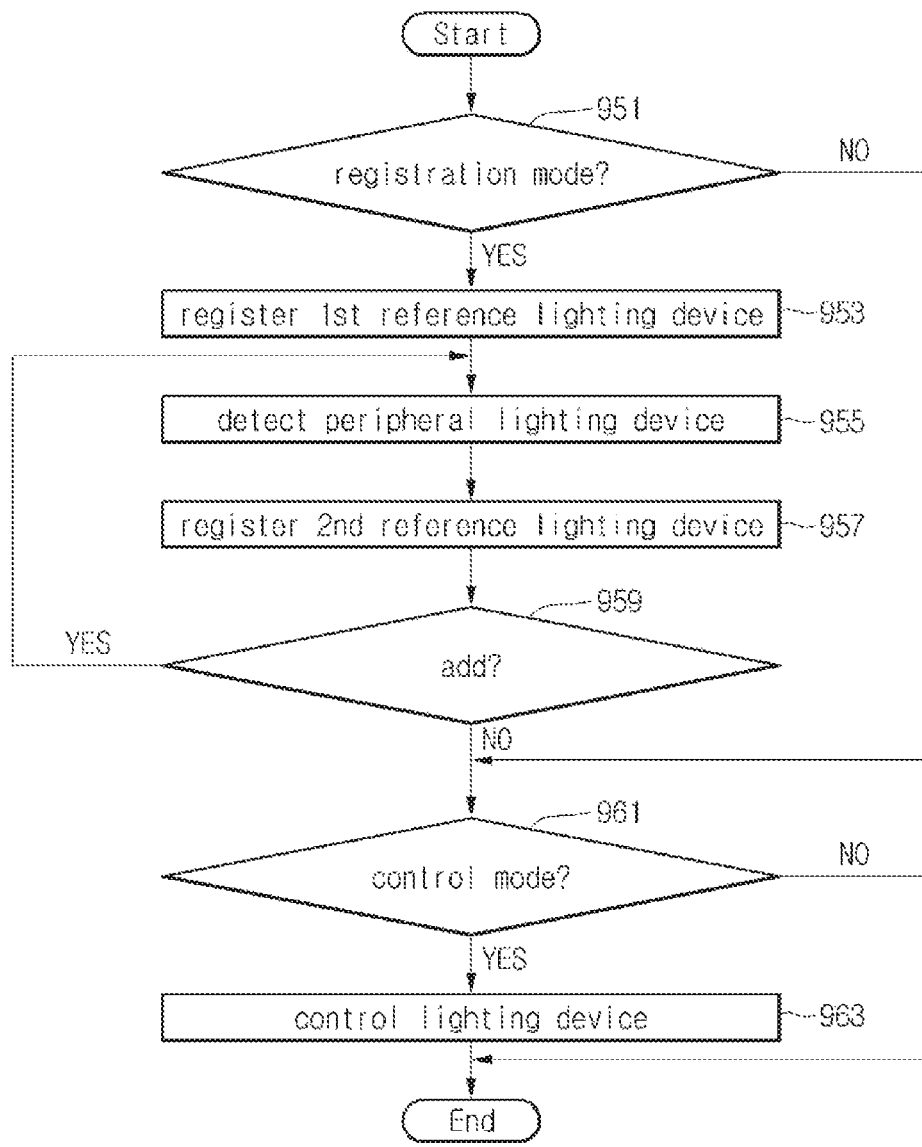
FIG. 23 is a flowchart showing the lighting control procedure of the lighting control apparatus according to the second embodiment.

FIG. 23 is a flowchart showing the lighting control procedure of the lighting control apparatus according to the second embodiment.

Referring to FIG. 23, the lighting control procedure of the lighting control apparatus 101 according to the present embodiment starts from the detection of the registration mode by the control module 202 of the lighting control apparatus 101 in step 951. For example, the lighting control apparatus 101 may include a registration execution key, and the control module 202 may enter the registration mode corresponding to the selection of the registration execution key. In addition, the control module 202 detects the power-on state of the lighting control apparatus 101 to enter the registration mode. In addition, if the registration mode is detected, the control module 202 registers the first reference lighting device 111a in step 953.

Thereafter, the control module 202 detects the peripheral lighting devices 111b, 111c, 111d, 111e, 111f, 111g, 111h, and 111i in step 955. In this case, the control module 202 controls the first reference lighting device 111a to detect the peripheral lighting devices 111b, 111c, 111d, 111e, 111f, 111g, 111h, and 111i. Next, the control module 202 registers the second reference lighting device 111g in step 957. In this case, the control module 202 selects one of the peripheral lighting devices 111b, 111c, 111d, 111e, 111f, 111g, 111h, and 111i and registers the selected peripheral lighting device as the second reference lighting device 111g.

Subsequently, the control module 202 determines whether to continue to perform the registration mode in step 959. In this case, if the control module 202 determines to continue to perform the registration mode in step 959, the control module 202 repeats steps 955 to 959 to add another second reference lighting device. Meanwhile, the control module 202 determines not to continue to perform the registration mode in step 959, the control module 202 terminates the registration mode.

Finally, if the control mode is detected in step 961, the control module 202 controls the registered reference lighting devices 111a and 111g in step 963. In this case, the control module 202 may individually or integrally control the reference lighting devices 111a and 111g. In other words, the control module 202 may turn on or turn off the reference lighting devices 111a and 111g, or may control the dimming operation of the reference lighting devices 111a and 111g.

As described above, although various examples have been illustrated and described, the present disclosure is not limited to the above-mentioned examples and various modifications can be made by those skilled in the art without departing from the scope of the appended claims. In addition, these modified examples should not be appreciated separately from technical spirits or prospects.

What is claimed is:

1. A lighting control system comprising:
   lighting devices; and
   a lighting control apparatus for registering at least one of the lighting devices and for controlling the registered lighting device,
   wherein the lighting control apparatus registers at least one of the lighting devices as a reference lighting device and registers at least one of other lighting devices by using the reference lighting device,
   wherein the reference lighting device transmits a peripheral search signal to the other lighting devices according to a command of the lighting control apparatus, receives a response message corresponding to the peripheral search signal from at least one of the other lighting devices, and notifies the response message to the lighting control apparatus; and
   wherein the reference lighting device transmits a list of the other lighting devices to the lighting control apparatus based on the response message.

2. The lighting control system of claim 1, wherein each lighting device has intrinsic identification data, and
   wherein the at least one of the other lighting devices transmits the response message including the intrinsic identification according to the peripheral search signal.

3. The lighting control system of claim 2, wherein the response message includes the received signal strength measured from the peripheral search signal by at least one of the other lighting devices, and
   wherein the lighting control apparatus registers the at least one of other lighting devices according to the received signal strengths between the reference lighting device and the other lighting devices.

4. The lighting control system of claim 3, wherein the reference lighting device measures the received signal strength from the response message.

5. The lighting control system of claim 3, wherein the lighting control apparatus registers at least one of the other lighting devices if the received signal strength exceeds a previously-stored received signal strength.

6. The lighting control system of claim 2, wherein the lighting control apparatus selects one of the lighting devices, transmits a registration request signal to the selected lighting device, receives a response message corresponding to the registration request signal from the selected lighting device, and registers the selected lighting device.

7. The lighting control system of claim 6, wherein the lighting control apparatus displays a display screen image including a registration request key and an input window, transmits the registration request signal if the registration request key is selected, and registers identification data corresponding to at least one of the lighting devices if the identification data is input into the input window.

8. The lighting control system of claim 1, wherein the lighting control apparatus displays a display screen image including a switch to turn on/off the registered lighting device and a control unit to control a dimming operation of the registered lighting device, and controls the registered lighting device by detecting a command according to the switch or the control unit.

9. A lighting control method comprising:
   registering at least one of lighting devices by a lighting control apparatus; and
   controlling the registered lighting device by the lighting control apparatus, wherein the registering at least one of the lighting devices comprises:
  registering one of the lighting devices as a reference lighting device by the lighting control apparatus;
  transmitting a peripheral search signal to the other lighting devices according to a command of the lighting control apparatus, by the reference lighting device;
  receiving a response message corresponding to the peripheral search signal from at least one of the other lighting devices, by the reference lighting device;
  transmitting the response message to the lighting control apparatus, by the reference lighting device; and
  registering at least one of the other lighting devices using the response message, by the lighting control apparatus;
  wherein transmitting the response message to the lighting control apparatus comprises transmitting a list of the other lighting devices to the lighting control apparatus based on the response message.

10. The lighting control method of claim 9, wherein the at least one of the other lighting devices transmits the response message including the intrinsic identification according to the peripheral search signal.

11. The lighting control method of claim 10, wherein the registering at least one of the other lighting devices comprises:
  registering at least one of the other lighting devices according to received signal strengths between the reference lighting device and the other lighting devices, by the lighting control apparatus.

12. The lighting control method of claim 10, wherein the transmitting of the response message comprises:
  measuring the received signal strength of the response message by the reference lighting apparatus.

13. The lighting control method of claim 9, wherein the registering at least one of the lighting devices further comprises:
  selecting one of the lighting devices by the lighting control apparatus;
  transmitting a registration request signal to the selected lighting device, by the lighting control apparatus;
  receiving a response message corresponding to the registration request signal from the selected lighting device, by the lighting control apparatus; and
  registering the selected lighting device by the lighting control apparatus.

14. The lighting control method of claim 13, wherein the registering at least one of the lighting devices further comprises:
  displaying a display screen image including a registration request key and an input window by the lighting control apparatus;
  transmitting the registration request signal by the lighting control apparatus if the registration request key is selected; and
  registering identification data corresponding to at least one of the lighting devices by the lighting control apparatus if the identification data is input into the input window.

15. The lighting control method of claim 9, wherein the controlling the registered lighting device comprises:
  displaying a display screen image including a switch to turn on/off the registered lighting device and a control unit to control a dimming operation of the registered lighting device by the lighting control apparatus; and
  controlling the registered lighting device by detecting a command according to the switch or the control unit, by the lighting control apparatus.

* * * * *